(12) United States Patent
Tonomura et al.

(10) Patent No.: US 6,571,054 B1
(45) Date of Patent: May 27, 2003

(54) METHOD FOR CREATING AND UTILIZING ELECTRONIC IMAGE BOOK AND RECORDING MEDIUM HAVING RECORDED THEREIN A PROGRAM FOR IMPLEMENTING THE METHOD

(75) Inventors: Yoshinobu Tonomura, Tokyo (JP); Hideaki Ozawa, Tokyo (JP); Yukinobu Taniguchi, Tokyo (JP); Takashi Sato, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 0 days.

(21) Appl. No.: 09/188,196

(22) Filed: Nov. 9, 1998

(30) Foreign Application Priority Data

Nov. 10, 1997 (JP) ............................................. 9-306266

(51) Int. Cl.[7] ................................................. H04N 5/91

(52) U.S. Cl. ........................... 386/95; 386/120; 386/121

(58) Field of Search ............................. 386/46, 95, 120, 386/121, 125, 126; 358/909.1; 345/328, 350

(56) References Cited

U.S. PATENT DOCUMENTS

| | | | | |
|---|---|---|---|---|
| 5,404,316 A | * | 4/1995 | Klingler et al. | 345/328 |
| 5,546,191 A | * | 8/1996 | Hibi et al. | 386/95 |
| 5,576,950 A | * | 11/1996 | Tonomura et al. | 386/121 |
| 5,706,097 A | * | 1/1998 | Schelling et al. | 358/909.1 |
| 5,761,485 A | * | 6/1998 | Munyan | 345/350 |
| 6,195,497 B1 | * | 2/2001 | Nagasaka et al. | 386/46 |

* cited by examiner

Primary Examiner—Huy Nguyen
(74) Attorney, Agent, or Firm—Connolly Bove Lodge & Hutz LLP

(57) ABSTRACT

In the creation of an electronic image book provided with a book-type interface; a video is analyzed; images are extracted from the video under predetermined event type conditions; the extracted images are stored as index information in an index management table; images are selected from the index management table under desired conditions and laid out as a sequence of representative images in a page screen; item numbers of the laid out representative images, information about their positions on the page and information about a video file linked to the representative images are recorded in a page management table in correspondence with pages; and at the same time, representative image data corresponding to the item number is recorded in an image data table.

42 Claims, 20 Drawing Sheets

FIG. 5A  VIDEO INDEX MANAGEMENT TABLE 121A

| EVENT TYPE | STARTING TIME | ENDING TIME | OTHERS |
|---|---|---|---|
| CUT | 0 | 1000 | |
| TELOP | 100 | 1000 | NTT NEWS (200, 10) |
| MUSIC | 100 | 2000 | |
| CUT | 1000 | 3000 | |
| SPEECH | 1100 | 2900 | GOOD AFTERNOON ! THIS IS THE NEWS OF * MONTH * DAY |
| CLOSED CAPTION | 1100 | 3000 | GOOD AFTERNOON ! THIS IS THE NEWS OF * MONTH * DAY |
| CUT | 3000 | 4000 | |
| BLACKOUT | 4000 | 5000 | |
| FADE-IN | 5000 | 8000 | |
| TELOP | 5100 | 6100 | WEATHER REPORT |
| DISSOLVE | 6100 | 9000 | |
| PAN | 6200 | 8000 | |
| CUT | 9000 | 12000 | |
| ZOOM | 10000 | 12000 | |

FIG. 5B  MANAGEMENT FILE 121B

| FILE NAME | POINTER TO VIDEO INDEX MANAGEMENT TABLE | POINTER TO CAMERA PARAMETER TABLE |
|---|---|---|
| NTT NEWS | EVENT | |

FIG. 5C  CAMERA PARAMETER TABLE 121C

| TIME | PAN | TILT | ZOOM |
|---|---|---|---|
| 0 | 0 | 0 | 0 |
| 100 | 0 | 0 | 0 |
| ⋮ | ⋮ | ⋮ | ⋮ |
| 6200 | 2 | 0 | 0 |
| 6300 | 2 | 0 | 0 |
| ⋮ | ⋮ | ⋮ | ⋮ |
| 10000 | 0 | 0 | 1 |
| 10100 | 0 | 0 | 2 |
| 10200 | 0 | 0 | 1 |
| ⋮ | ⋮ | ⋮ | ⋮ |

FIG. 14A   FIG. 14B   FIG. 14C   FIG. 14D
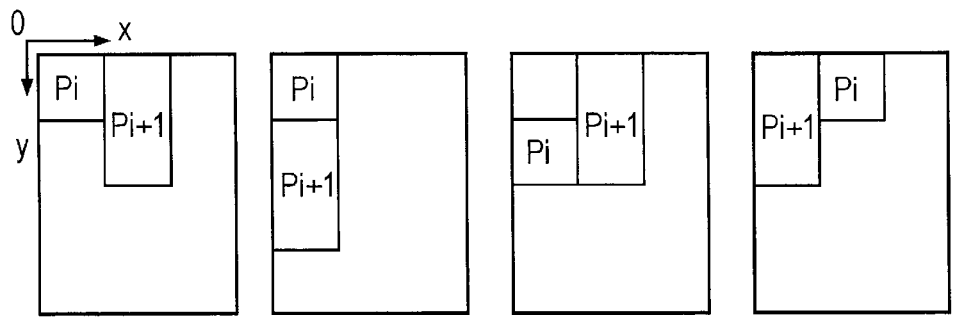
FIG. 15
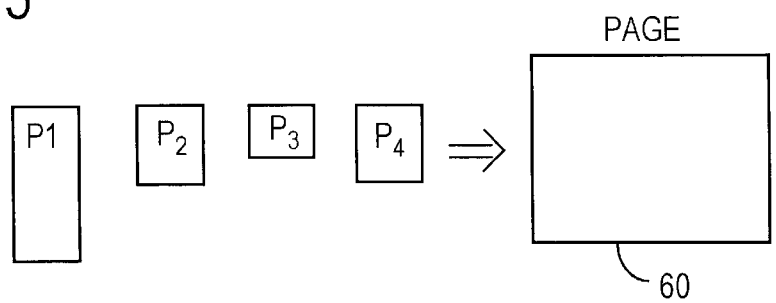
FIG. 16A   FIG. 16B   FIG. 16C
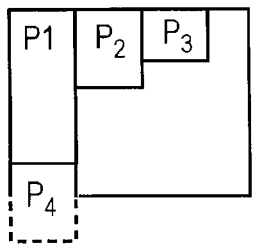 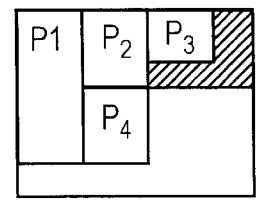 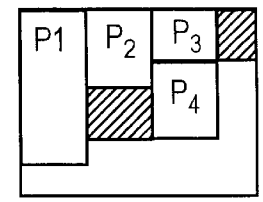
FIG. 16D
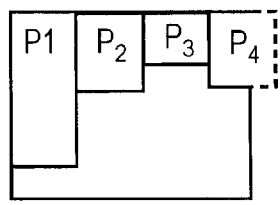

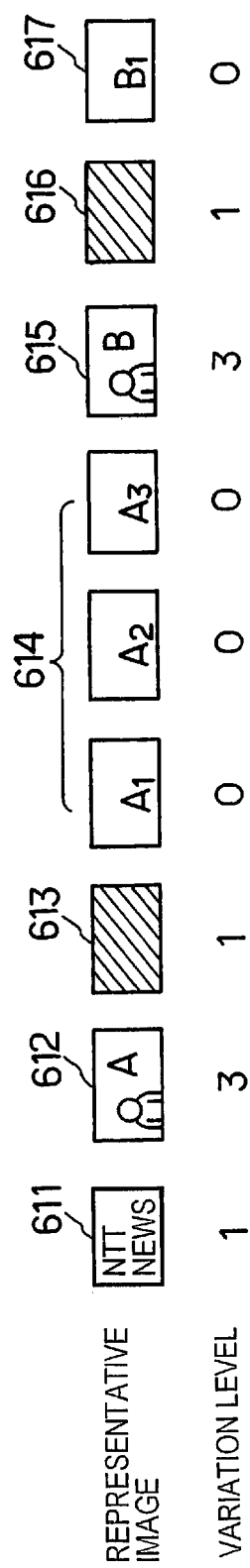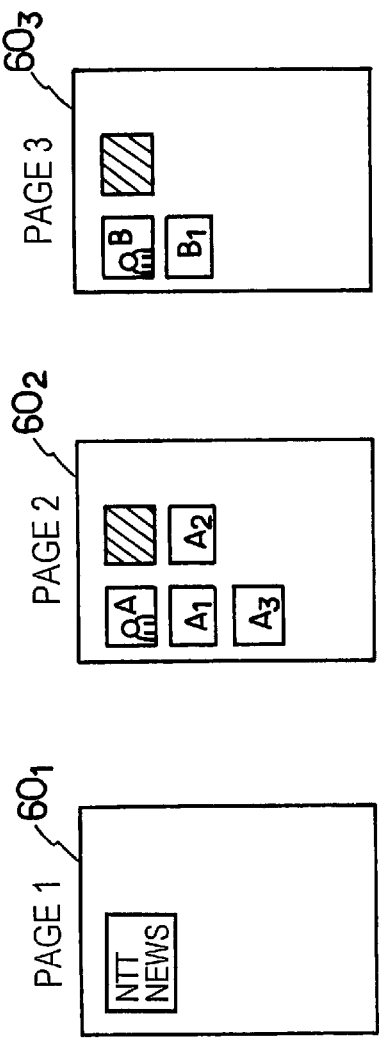

FIG. 23A
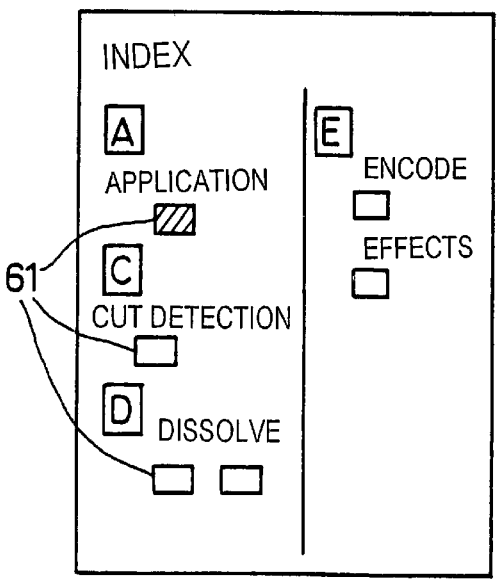
FIG. 23B
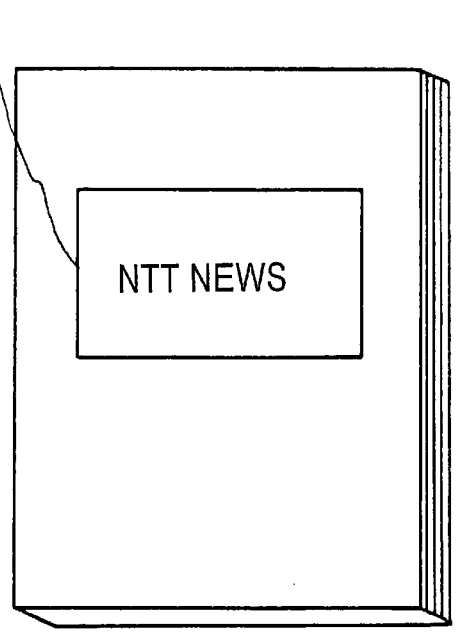
FIG. 23C

METHOD FOR CREATING AND UTILIZING ELECTRONIC IMAGE BOOK AND RECORDING MEDIUM HAVING RECORDED THEREIN A PROGRAM FOR IMPLEMENTING THE METHOD

BACKGROUND OF THE INVENTION

The present invention relates to a method for converting a video sequence into a browsable electronic image book by analyzing the video sequence, detecting specific events contained therein and automatically laying out representative images extracted from the video sequence based on the events, and the invention also pertains to a medium having recorded thereon a program for implementing the method.

FIG. 1 depicts an example of a video monitor screen on a computer according to the prior art, FIG. 2 an example of a video editing user interface on a computer according to the prior art, and FIG. 3 a prior art example of a representative image array of a video displayed in a scrolling window. In the figures, reference numeral 20 denotes a monitor screen, 21 an on-time-axis playback controller, 22 images sampled at regular time intervals, 24 a time axis, 23 sampled images, and 25 a scroll bar.

With an interface for interactive browsing of a video sequence in some form, it is conventional to effect playback control on the time axis as is seen in a video player. That is, it is common to control playback pointers on the time axis for start and stop of playback, fast forward and so forth. In the case of a digital video on a computer, its playback can be started at an arbitrary point directly specified on the time axis. For example, in such a video monitor as shown in FIG. 1, when specifying one point on the time axis of the on-time-axis playback controller 21 with a pointing device, images corresponding to the specified and subsequent points in time are displayed on the monitor screen 20.

To make browsable a digital video which is handled on a computer, there are cases where the system uses an interface of the type wherein reduced images obtained by sampling the video at equal time intervals are aligned along the time axis on the horizontal axis to determine the section to be edited, or plural images are listed as is seen in a desktop video editing system called a nonlinear editor. FIG. 2 shows an example of such a video editing user interface. A user can easily edit the video by manipulating the reduced images 22 sampled at equal time intervals as depicted in FIG. 2.

There is also such an interface as depicted in FIG. 3 which detects cut points and similar events in a video sequence, samples images based on the detected events and displays them as a two-dimensional array of sampled images 24 in a window on the computer screen. The sampled images 24 can be scrolled by operating the scroll bar 25.

In Japanese Pat. Laid-Open No. 198331/97 entitled "Electronic Filing System with a Data Management-Output Method," there is disclosed an electronic filing system of the type having layout edit facilities enable system-managed image data or the like to be displayed in easily readable form of an album or book and permits arbitrarily changing of the display method.

With the prior art described above, however, it is difficult to meet a wide variety of user's requirements of, for example, displaying the entire video sequence or a particular image sequence of the video. More specifically, in the example of FIG. 1, the playback control is effected only by controlling the control bar and hence is relatively easy, but an image only at one point in time can be displayed; therefore, it is difficult for the user to grasp the entire contents of the video or access a particular portion of the video.

The example of FIG. 2 is advantageous over the FIG. 1 example in that a plurality of sampled images can be displayed over a certain time width, but since this example is intended for one-dimensional editing on the time axis, it is necessary to lengthen the sampling interval on the time axis for observing the image sequence for a certain period of time or to shorten the sampling interval for observing the image sequence in detail. Accordingly, this prior art example is inevitably complex in operation, and has a difficulty in providing a sense of position on the time axis about a particular image.

The example of FIG. 3 samples images for each occurrence of some event in the video, and hence it is very suitable for grasping the general contents of the video, but in the case of a little longer video, the number of sampled images 24 becomes so large that the scroll bar 25 must be moved up and down for observing the entire video sequence; furthermore, it is also difficult for the user to acquire a sense of place about a particular image in the entire video sequence.

In the case of managing video data in the electronic filing system which manages image data or the like in the form of an album, the first image of the video can be displayed on the album, but for observing the video contents in detail, there is no method other than displaying the video on the video monitor. Of course, it is possible to manually extract representative images from the video and paste them on the album, but this is extremely time-consuming. Thus, there has not been available any method which offers an electronic image book equipped with a book-type interface.

In Taniguchi et al., "PanoramaExcerpts: Extracting and Packing Panorams for Video Browsing," Proceedings of the fifth ACM International Multimedia Conference, Addison-Wesley, pp.427–436, 1997 there is disclosed a user interface which displays representative images in array in one display screen and, upon specifying a desired one of the representative images, plays back the corresponding video sequence. There is also disclosed a method for aligning the representative images in a space-efficient manner within a width-defined screen while keeping the temporal order of the representative images unchanged. However, this user interface screen has its width defined but has its vertical length undefined. That is, the concept of a page having its lateral and vertical sizes defined is not introduced, and accordingly, the above user interface does not constitute a book type interface.

SUMMARY OF THE INVENTION

An object of the present invention is to provide a method for creating and utilizing an electronic image book that has a book type interface which solves the above-mentioned defects of the prior art and which automatically or semi-automatically converts a video sequence into a book-type electronic image book, and hence enables a user to grasp the context of video information in its entirety as well as in detail, and a recording medium that has recorded thereon a program for implementing the method.

According to the present invention intended, with a view to settling the above-mentioned problems, an electronic image book bound just like an actual book is automatically created by analyzing a video sequence, detecting various events contained therein, generating a sequence of representative images for each event by a user's specified method and laying out the representative images in their temporal order.

More specifically, the present invention automatically creates a book-like electronic image book by a procedure of analyzing a video sequence to detect various events such as a scene change, managing the detected events and feature information computed in the process of analysis as video index information and generating a sequence of representative images while referring to the managed video index information according to user's instructions, and a procedure of laying out the sequence of representative images in their temporal order in a page by a predetermined rule and, if a predetermined condition for a page break is satisfied, laying out the representative images in a new page.

Furthermore, by prestoring link information for partial images, such as elapsed times of images after the beginning of the video, in a page management table, it is possible to play back the partial images associated with a particular representative image specified by a user with a mouse or the like during browsing.

Besides, with a tag function for page control and image display and a function for playing back the original video sequence associated with a user's specified representative image displayed on page, a functional interface for utilizing the electronic image book enables the user to grasp video information in detail through an image array displayed for each event and allows ease in his recognizing the general flow of the video or its contents as well, for example, by an operation of flipping through the pages. The present invention provides advantages of such a book-type interface and offers a wide variety of methods for accessing particular portions of a video sequence.

Thus, the present invention: (1) permits automatic creation of an electronic image book with a book-type interface from a video sequence; (2) implements video browsing of the electronic image book by laying out the video sequence as a two-dimensional array of representative images; (3) enables a user to make an access to the electronic image book for browsing it for each page and permits quick browsing and efficient and effective storage of information because the representative image arrays are divided for each page; (4) permits a quick access to a desired portion of the video sequence through browsing; (5) offers a book-type interface that permits an access for video browsing and is easy of use even for persons unfamiliar with computers; and (6) makes it possible to introduce schemes for information access effective for documents (for example, tagging, a table of contents, indexes, and so forth) into videos as well.

BRIEF DESCRIPTION OF THE DRAWINGS

FIG. 5A is a table showing an example of a video index management table 121A;

FIG. 5B is a table showing an example of a management file 121B;

FIG. 5C is a table showing an example of a camera parameter table;

FIG. 14A is a diagram for explaining a layout constraint;

FIG. 14B is a diagram for explaining another layout constraint;

FIG. 14C is a diagram for explaining another layout constraint;

FIG. 14D is a diagram for explaining still another layout constraint;

FIG. 15 is a diagram illustrating a concrete example for explaining a layout method of Embodiment 2;

FIG. 16A is a diagram depicting a layout process of Embodiment 2;

FIG. 16B is a diagram depicting another layout process of Embodiment 2;

FIG. 16C is a diagram depicting another layout process of Embodiment 2;

FIG. 16D is a diagram depicting still another layout process of Embodiment 2;

FIG. 20 is a diagram for explaining page layouts based on content-change levels;

FIG. 21A is a diagram showing an example of a representative image of a first page selected based on the content-change level in FIG. 20;

FIG. 21B is a diagram showing an example of representative images of a second page selected based on the content-change level in FIG. 20;

FIG. 21C is a diagram showing an example of representative images of a third page selected based on the content-change level in FIG. 20;

FIG. 23A is a diagram showing an example of the table of contents;

FIG. 23B is a diagram showing an example of the front cover; and

FIG. 23C is a diagram showing an example of the index page.

DETAILED DESCRIPTION OF THE PREFERRED EMBODIMENTS

<<Embodiment 1>>

Figure 1:
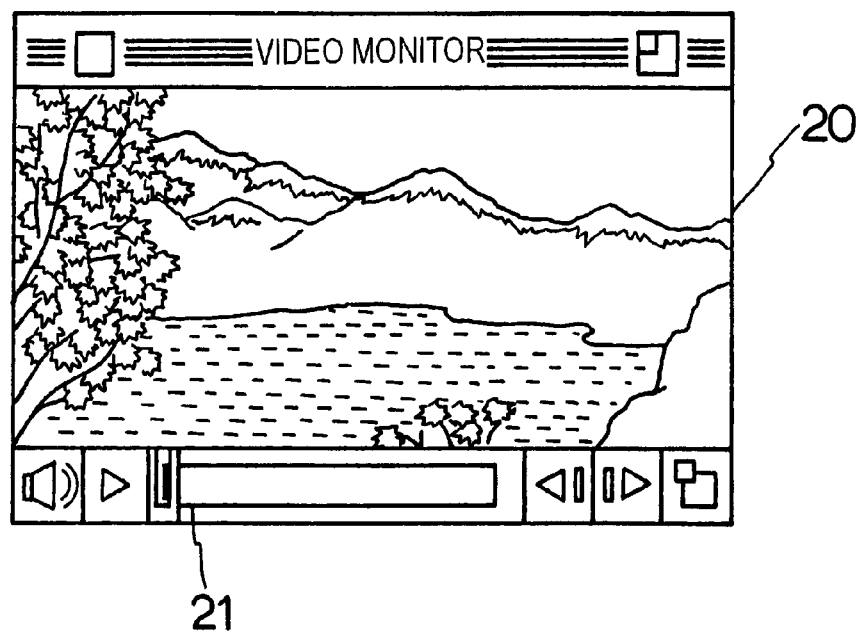
FIG. 1 is a diagram depicting an example of a video monitor on a computer according to the prior art.
Figure 2:
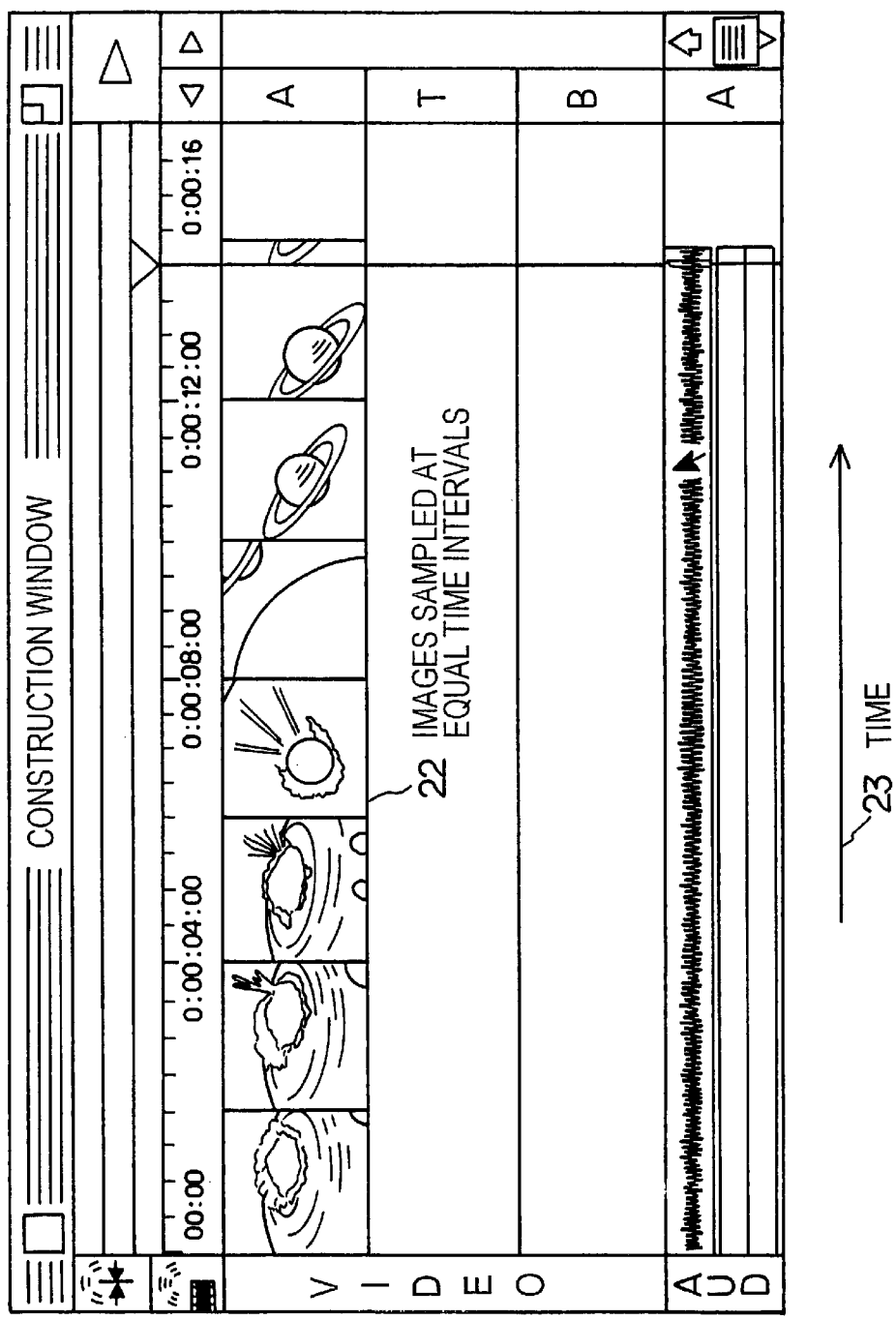
FIG. 2 is a diagram depicting an example of a video editing user interface on a computer according to the prior art.
Figure 3:
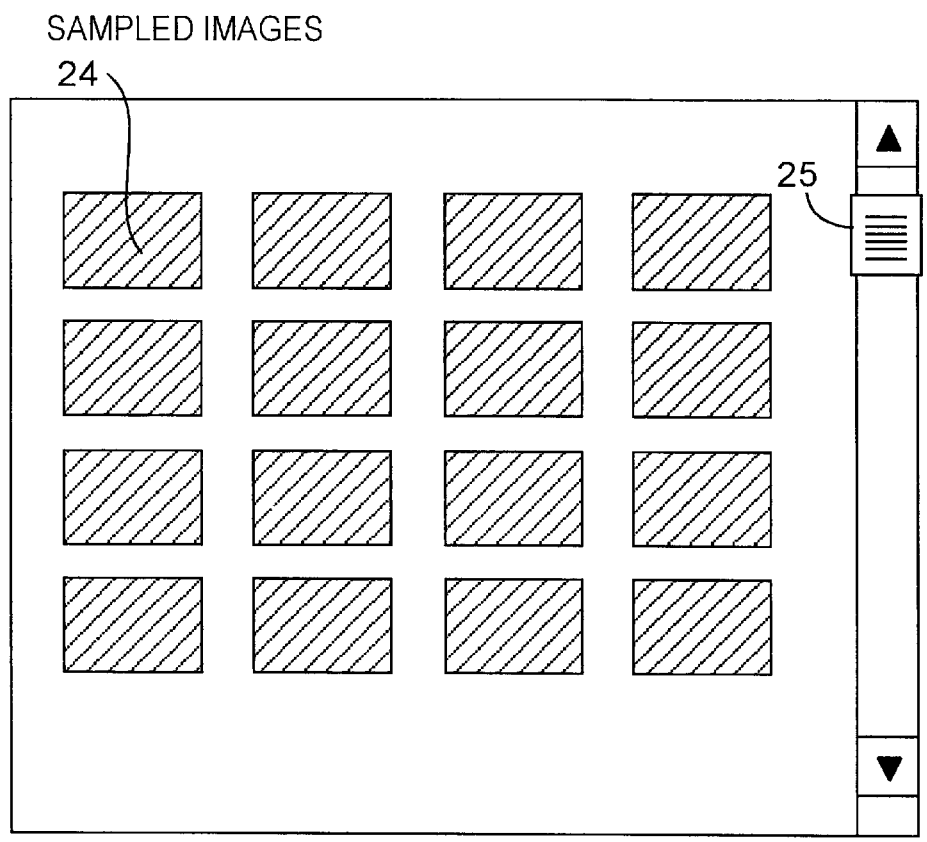
FIG. 3 is a diagram depicting a prior art example of representative images of a video sequence displayed in a scrolling window.
Figure 4:
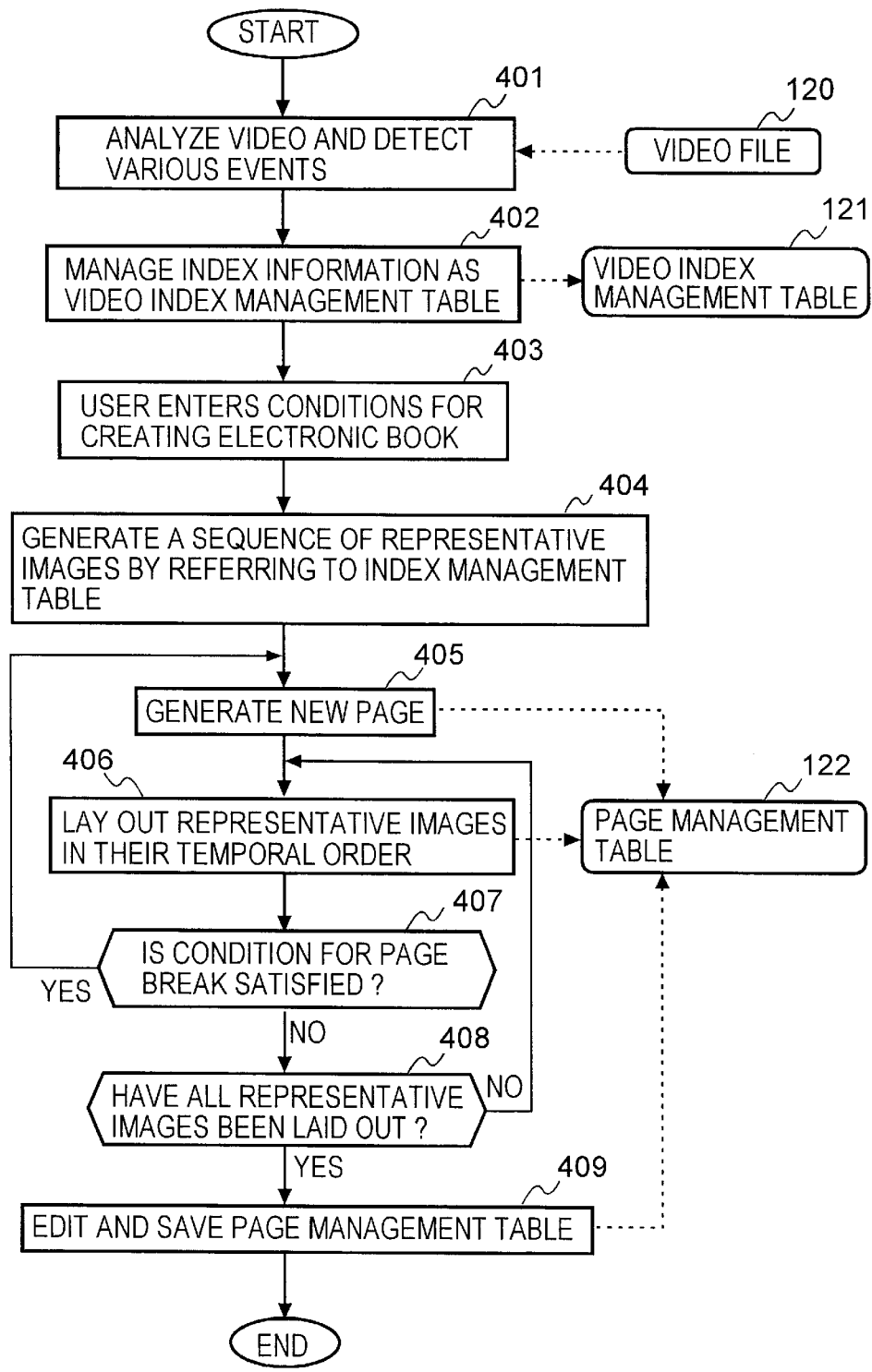
FIG. 4 is a flowchart showing the procedure for creating an electronic image book according to the present invention.

FIG. 4 shows a procedure for creating an electronic image document (an electronic image book) according to the present invention.

A brief description will be given first of the entire procedure. Step 401 is to analyze the video of a desired video file 120 and to detect the afore-mentioned various events. Step 402 is to create, as a video index management table 121 as depicted in FIG. 5A, the correspondence between the times of the occurrence of the detected events in the video and additional information, using the events as indexes. Step 403 is a step for a user to input conditions such as the types of events whose images are used as representative images and the layout of each page. Step 404 is to extract, as representative images, referring to the video index management table 121 of FIG. 5A those images which meet the input conditions. Step 405 is to generate a new page, and step 406 is to align the extracted representative images in their temporal order in the page and to record their positions in a page management table 122. Step 407 is to decide if the page has become full, or if the alignment of the representative images has reached a breakpoint in terms of image contents. If either one of the decision results is YES, the procedure goes back to step 405 for generating a new page, after which steps 406 and 407 are repeated again. When the page-break condition is not met in step 407, a check is made in step 408 to see if the extracted representative images have all been laid out. If not, the procedure returns to step 406, and if the layout is already completed, the procedure proceeds to step 409, wherein the front cover, the table of contents and indexes are created, followed by editing and saving the page management table 122. Each of the steps will be described below in detail.

[Event Detecting Step 401]

Step 401 is a step that analyzes the video file 120 provided as an input and detects various events contained therein. In this instance, events that can be detected as image-related events are: those associated with scene changes, such as a cut, a dissolve, a fade-in and a wipe; those associated with camera operation, such as camera pan/tilt; the start/end of a telop; and the start/end of a blackout period. For example, the start/end of a commercial (CM) in a TV program can be detected as an event. Sound-related events are the start/end of a section containing music, and the start/end of a section containing human voice. Events associated with additional information except image and sound are a large time-code change point and the start/end of a closed caption. A possible example of an event more closely related to the video contents is the start/end of a section in a news program wherein an announcer appears. A description will be given below of methods for detecting such various events as mentioned above.

The cut is an editing technique for instantaneously changing a scene to another; the dissolve is an editing technique for changing a scene to another while gradually dissolving the two scenes; the fade-in is a technique for gradually presenting a scene from a pitch-black image; and the wipe is a technique for wiping a scene away while at the same time showing the next scene. Such scene-change events can be detected from videos by using existing techniques (for example, Japanese Pat. Appln. No. 317663/93 entitled "Video Cut Point Detecting Method and Apparatus").

The pan and tilt are camera operations for shooting while moving a camera from one side to another and up and down, and the zoom is a camera operation for shooting while changing the field angle. The events related to these camera operations can be detected from videos by using conventional techniques (for example, Japanese Pat. Appln. No. 244674/92 entitled "Video Shooting State Detecting Method"). Since camera parameters are computed which indicate how much the camera was moved, they are managed together as video indexes.

The telop is subtitles superimposed on the screen at an editing stage. It is checked whether the telop is present in the screen, and if so, its position is detected; the starting/ending times of the telop and its position are managed as video index information. Also it is possible to convert the telop to text data by a character recognition technique and manage it as video index information.

The blackout refers to the state in which the screen goes pitch-black (or filled in all over it with one color). The decision of the blackout can be made by calculating the variance of the brightness value all over the screen and checking whether the variance is below a threshold value.

For example, the start/end of a commercial (CM) section in a TV broadcast can be detected as an event by the prior art technique disclosed in Japanese Patent Application Laid-Open No. 219835/97 entitled "Video Summarizing Method and Apparatus." This prior art method is to specify the commercial section, for example, through utilization of the knowledge (1) that commercials in Japanese TV broadcasts have a fixed length of 15 or 30 sec and (2) that the commercials contains many cuts.

As the sound-related event, the start/end of a scene that contains music or human voice can be used. It is also possible to extract text data from the section that contains human voice through utilization of the speech recognition technique.

Additionally, a change in the shooting conditions can be detected as one event by decoding time code signals embedded in video signals and detecting their discontinuity. Also it is possible to detect, as an event, the start/end of text data obtained by decoding a closed caption (subtitle information embedded in video signals) with a commercially available decoder.

The start/end of the section in which an announcer appears can be detected using a method disclosed in Deborah swanberg, Chiao-Fe Shu, Ranesh jain: Knowledge Guide Parsing in Video Databases, SPIE vol. 1908(1993), pp.13–24.

[Video Index Management Table 121]

In step 402, information about various events detected as referred to above and feature information computed in the analyzing process are stored in a video index information management table 121A.

FIG. 5 illustrates an example of the video index information management table 121A. In the management table 121A there are managed an event type 501, an event starting time 502, an event ending time 503, and other additional information 504. The kinds of the afore-mentioned various events sequentially extracted from a video sequence are written in the event type column 501, and at the same time, the starting and ending times of each event are written in the columns 502 and 503. As the event start and end points 502 and 503, the times elapsed after the beginning of the video file 120 are recorded in milliseconds. In the column 504, as additional information for the telop event, information about a character string displayed as the telop and its position in the screen are recorded, and for the human voice (speech) event, information about text data which is obtained by speech recognition is recorded.

In a management file 121B depicted in FIG. 5B there are recorded and managed, in association with the video index management table 121A, an analyzed video file name 505, pointer information (address) 506 for the vide index table 121A, pointer information (address) 507 for a camera parameter table 121C described below in respect of FIG. 5C, and a real video file 120.

In the camera parameter table 121C depicted in FIG. 5C there are stored in correspondence with time 509, a pan parameter 510 indicating how many pixels the camera was moved over them horizontally, a tilt parameter 511 indicating how many pixels the camera was moved over them vertically, and a zoom parameter 412 indicating how many pixels the field angle was increased or decreased. These parameters are obtained by the analysis of the video sequence in step 402.

In the video index table 121A, feature information of images chosen in the video analyzing process can also be stored other than the event information. As image-related feature information, it is possible to use the difference between images that are selected in the process of detecting the scene-change event, a camera parameter that is selected in the process of detecting the camera-operation event, information about the frequency of occurrence of color, edge information, and so forth. As the sound-related feature information, FFT coefficient information can be used.

As described above, the video index information can be managed as a data structure of a main storage, or file, or a table of a relational database. Since the video analysis results may sometimes contain an error, it is preferable to provide an user interface which is capable of correcting the error. In such an instance, it is possible to manually provide an event which cannot be detected by the video analysis, and information such as a keyword, the names of a person and a product appearing in the video sequence, the place of shooting and the date and time of shooting. Further, it is also possible to employ, as the format for storing the video index information in the file, such standard formats as SGML, XML and HTML, so as to facilitate data exchange between applications.

In step 403, the user sets the conditions for creating the electronic image book.

Figure 6:
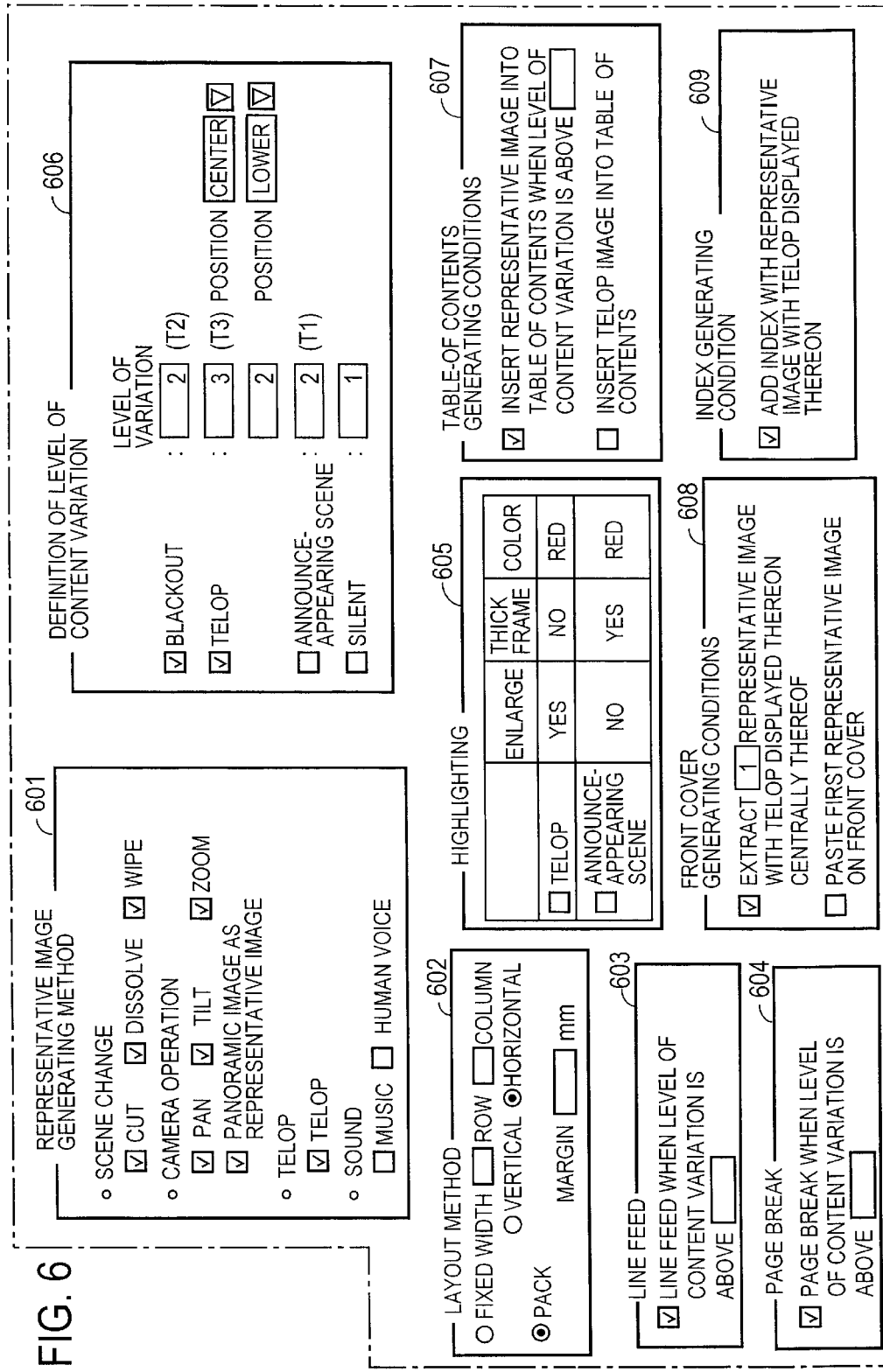
FIG. 6 is a diagram depicting an example of displays provided for a user to set conditions for creating an electronic image book.

FIG. 6 illustrates examples of condition setting windows on the computer screen. The user specifies on the screen a representative image generating method 601, a layout method 602, a line feed method 603, a page break method 604, a method 605 for selecting a representative image to be highlighted, a method 606 for computing the level of a video content variation, a table-of-contents generating condition 607, a front-cover generating condition 608, and an index generating condition 609. In the window of the representative image generating method 601, the user: specifies a scene change by selecting a desired event (or events) from cut, dissolve and wipe; specifies a camera operation by selecting a desired event from pan, tilt, zoom and panorama; and specifies whether to select or not telop, music and sound. In the window of the layout method 602, the user selects a layout with rows and columns of fixed widths or a layout packing representative images with specified margins. In the window of the line feed method 603, it is specified whether to perform a line feed when the level of change in the representative image contents is above a predetermined threshold value. In the page break method 604, too, it is specified whether to perform a page break according to the level of change in the image contents. In the highlighting method 605, enlargement, thick frame, color and so forth are selected for a specific event (for example, a telop or a scene in which an announcer appears).

In the window of the table of contents generating condition 607, it is specified whether to insert in the table of contents representative images whose levels of content variations are above a predetermined threshold value and/or a telop image. In the window of the front cover generating condition 608, it is specified whether to paste on the front cover a desired number of representative images each having a telop displayed centrally thereof or the first one of those representative images. In the window of the index generating condition 609, it is specified whether to add to the index the representative images with telops displayed thereon. In the window of the definition of the level of content variations 606, the assignment (weigthing) of values are specified for the levels of image content variations described later on, such variations such as a blackout, a telop, an announcer-appearing scene and silence. These settings will be described in detail later on.

[Generation of Representative Images 404]

Step 404 is a step of generating a sequence of representative images by referring to the video index table 121A in accordance with the conditions set by the user (see 601 in FIG. 6). Each representative image is a static image of one frame selected from the video or one static image synthesized from a plurality of frames. This representative image may be one that has contents intended for presentation, or a static image which is linked to a partial image (for example, a dynamic image) composed of a short sequence of frames and is provided, for example, in the form of a button. In the latter case, at a click of the representative image button, the dynamic image linked thereto can be played back. This dynamic image may be accompanied with sound information (for example, speech and music).

Now, a description will be given of the case where the user specified, in the window of the representative image creating method 601 shown in FIG. 6, the generation of a representative image based on such a scene-change event as a cut, dissolve, fade-in, or the like. In the first place, the events in the event type column 501 of the video event management table 121A of FIG. 5A are checked sequentially from above. Upon finding a line on which there is recorded such a scene-change event as a cut, dissolve, fade-in, or the like, the starting time 502 of the event is read out, and an image immediately after the start of the event or an image after a certain elapsed time is captured as a representative image from the video file 120. Similarly, based on a telop event, an image with a telop displayed thereon may also be used as a representative image.

There are cases where the first image of an event is inappropriate as a representative image. For example, in the case of generating a representative image based on an event of the start or end of the commercial section, it is desirable to use, as a representative image, the last image of the commercial section rather than the first image of the section. The reason for this is that, in many instances, the names of firms and their products are displayed as telops at the end of the commercial. In the generation of the representative image based on a scene-change event, too, it is rather preferable in some cases to use an image appearing a certain elapsed time after the start of the event, for there occasionally arises a situation where only the background is displayed immediately after a change of a scene and a telop or an important object appears in the new scene with the lapse of time.

It is also possible to newly synthesize a representative image as well as to select a representative image from an image sequence in the video file. For example, a panoramic image can be created as a representative image by synthesizing images that are contained in the section of such a camera operation as pan, title, or zoom (for example, a panoramic image 61 described later on with reference to FIG. 7). The panoramic image can be created by calculating the amount of movement of the camera based on the camera parameter table of FIG. 5C and overlapping the images while displacing them corresponding to the amount of movement of the camera (Japanese Patent Application Laid-Open No. 284049/95 entitled "Video Access Device"). The image immediately after the scene-change event may sometimes represent only part of the new scene, and hence it is not always appropriate as a representative image in some cases; however, the use of the panoramic image makes it possible to generate a representative image that covers space captured while the camera operation was performed. Furthermore, the creation of a representative image by a combination of the scene-change event and the camera-operation event permits efficient representation of every scene with a sequence of representative images. More specifically, for a scene with no camera operation section, an image immediately following the scene-change event or an image appearing after a certain elapsed time is used as a representative image, and for a scene with the camera operation section, a panoramic image is generated as a representative image.

Figure 7:
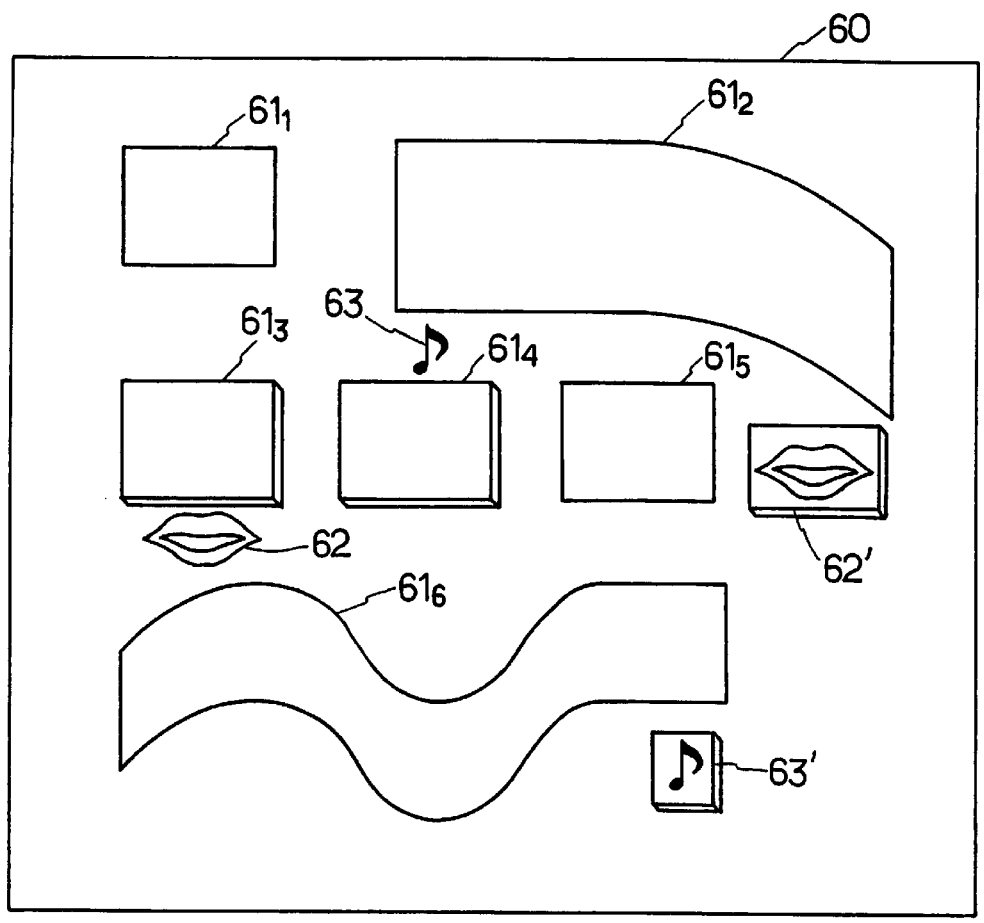
FIG. 7 is a diagram showing an example of a screen layout of representative images and representative audio-related images according to the present invention.

As for a representative image button linked to a video segment accompanied with sound, if the sound corresponding to a particular kind of sound such as music, speech, hand clapping, or collision, an icon indicating the kind of sound is placed near the corresponding representative image (a speech representing image 62 and a music representing image 63 in FIG. 7 of which a description will be given later on). Of course, buttoned icons 62' and 63' for playing back speech information and music of the page may also be provided independently of any representative images.

Step 405 is a step of generating a new page. More specifically, a table of one page is newly added to the page management table, but no detailed description will be given here since the page management table will be described later on.

Figure 8A:
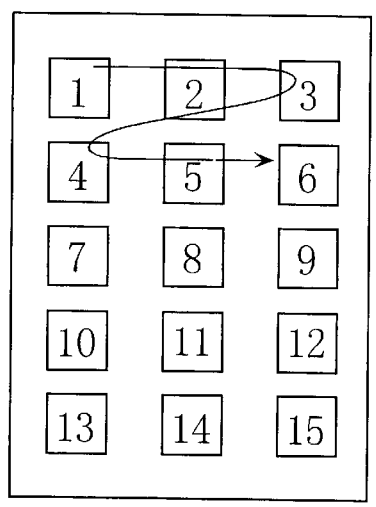
FIG. 8A is a diagram depicting an example of a method for laying out representative images in a page.
Figure 8B:
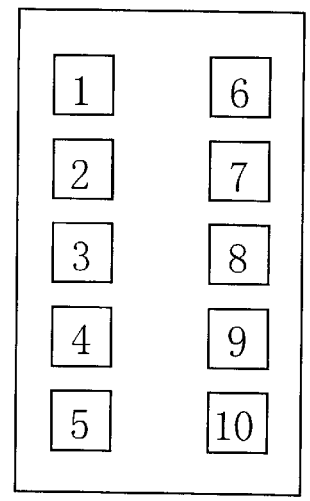
FIG. 8B is a diagram depicting another example of the method for laying out representative images in a page.

Step 406 is a step of laying out representative images on a page in the temporal order of their appearance, using the method specified by the user in step 403. The representative images may be laid out from left to right, starting at the upper left corner of the page just like writing in a Western language, as depicted in FIG. 8A, or they may be disposed in the vertical direction as depicted in FIG. 8B; that is, the layout of the representative images may be selected to suit the needs or preferences of the user. When the representative images differ in size as depicted in FIG. 7, they should be laid out with the least possible dead space—this will be described in detail later on with reference to Embodiment 2. It is desirable to lay out the representative images in such a manner as to allow ease in recognizing their temporal order, because they are extracted from a video.

In step 407, upon each layout of one representative image, a check is made to see if the condition for page break is satisfied, and if the page break is necessary, the procedure returns to step 405 to generate a new page. When the user did not specify the condition for page break in the page break condition setting window 603 in FIG. 6, a check is made to see only if there is sufficient space for the representative image concerned, and if not, the page break is carried out. Another form of the page break condition will be described later on.

If no page break is required, it is checked in step 408 whether the layout of all representative images has been completed.

In step 409, the user corrects the automatically created electronic image book. For example, an unnecessary representative image generated due to an error in event detection is omitted from the image book, or a new page or tag is inserted thereinto. Such corrections are recorded on the page management table 122.

To enable the user to manually generate the table-of-contents page by selecting a representative image for each large unit of a video (corresponding to a chapter or clause in a sentence) is also preferable from the viewpoint of improving the ease-of-use of the electronic image book to provide enhanced efficiency of video browsing.

Likewise, the front cover can also be generated by making the user select an image representing the entire video contents, for example, a title frame of a movie or program logo. By this, a glance at the front cover will show the contents of the electronic image book.

It is also possible to generate an index page by making the user select important items in the video or representative images with keywords as index entries and input keywords indicating the index entries. Upon completion of the extraction of the index entries, the keywords are rearranged in alphabetical order and the representative images are laid out in their order by a predetermined rule, whereby the index page is generated.

[Page Management Table 122]

Figure 9:
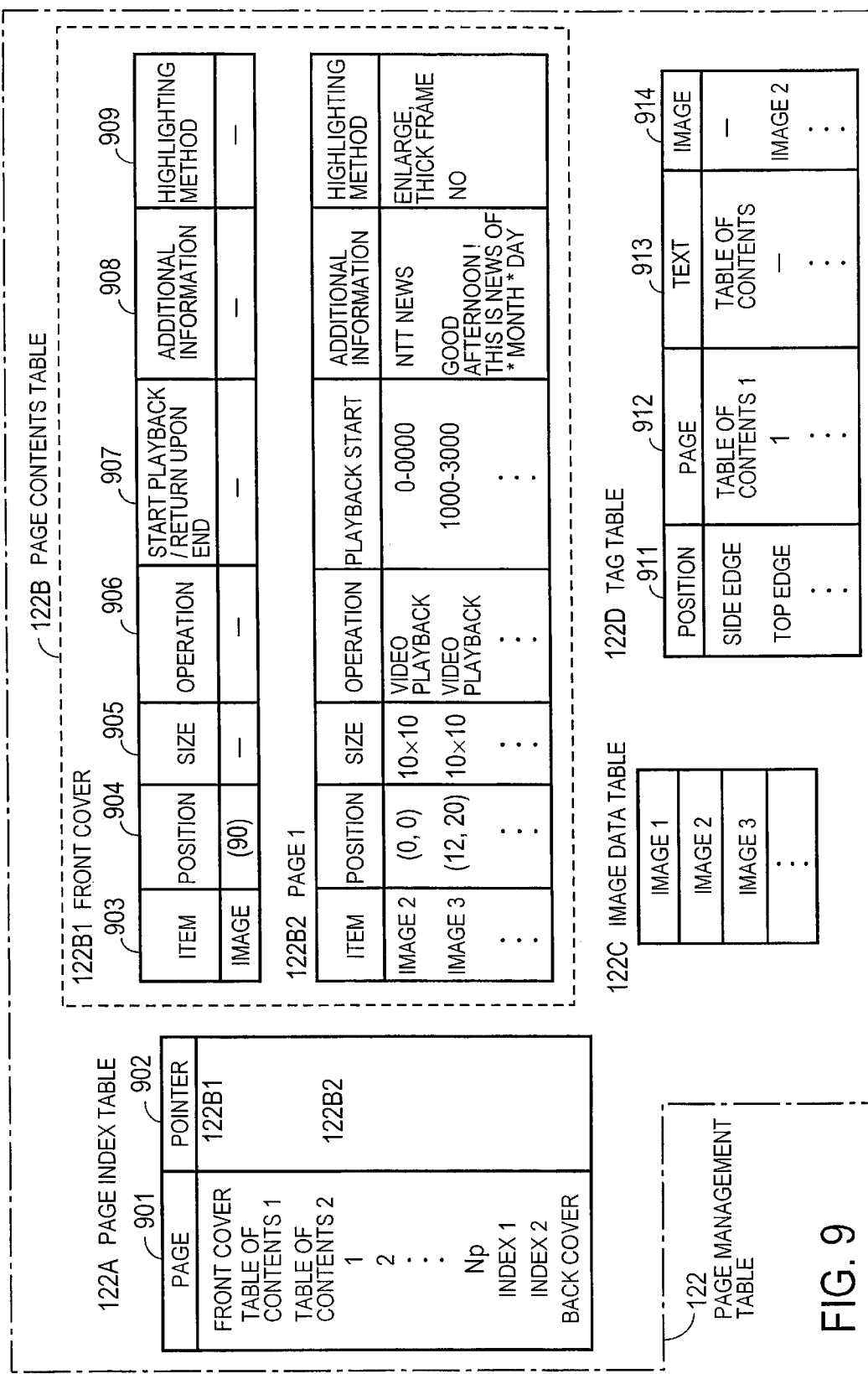
FIG. 9 is a diagram for explaining a page management table.

A sequence of representative images created by the procedure described above and information on their layout are stored and managed in the page management table 122. Referring now to FIG. 9, the page management table 122 will be described. The page management table comprises a page index table 122A, a page contents table 122B for the management of information about each page, an image data table 122C, and a tag table 122D.

In the page index table 122A there are stored a book page configuration 901 (front cover, table-of-contents page 1, table-of-contents page 2, . . . text page 1, text page 2, . . . , text page Np, index page 1, index page 2, . . . , back cover) and pointer information 902 for the page contents table.

In the page contents table 122B there are provided contents tables which have a one-to-one correspondence with the pages and hence are equal in number to them and in which images, character strings and so forth for display in the respective pages are described The page contents table 122B is shown, by way of example, to have tables 122B1 and 122B2 corresponding to the front cover and text page 1, respectively. In each table there are stored: an item 903 to be displayed on the page; its display position 904; its display size 905; an operation 906 which is performed when the item is selected through a button on the screen with a mouse or the like; the playback/ending time 907 in the case where the item is a buttoned representative image (a representative image linked to partial video images); other additional information 908 such as character information; and highlighting method 909. In the process 405 (FIG. 4) for newly generating a page, the page contents table is newly generated.

Items that can be placed in page are every kind of data that can be managed by a computer, such as a text, images, representative images linked to a video and sound data. All the items that are carried on the electronic image book are given item numbers for identification, and written in the columns of item 903. The operation 906 that is performed in response to the selection of the item is not limited specifically to the "playback of partial video images" but may also be "jump to a linked page," "enlarged image display," "sound playback," and so forth. In the column of additional information 908, the additional information 504 in the video index table 121A (FIG. 5A) is stored after being copied therefrom. It is also possible, however, to make the user input a keyword or the like in the page management table editing and retaining step 409 (FIG. 4) and store the input information in the column of additional information 504. In the column of highlighting method 909 there are stored, for example, "no highlighting," "thick frame," and "enlargement."

In the image data table 122C, a sequence of representative images to be displayed on the electronic image book are stored in correspondence with the item numbers.

In the tag table 122D there are stored tag display position 911, page 912, a character string 913 to be displayed on the tag, and a display image 914.

The page management table 122 of FIG. 9 described above may be retained as a data structure or file in a main storage. The contents of the page management table 122 are retained as a file, and the electronic image book can be transferred via a communication line or the like.

[Browsing of Electronic Image Book]

Figure 10:
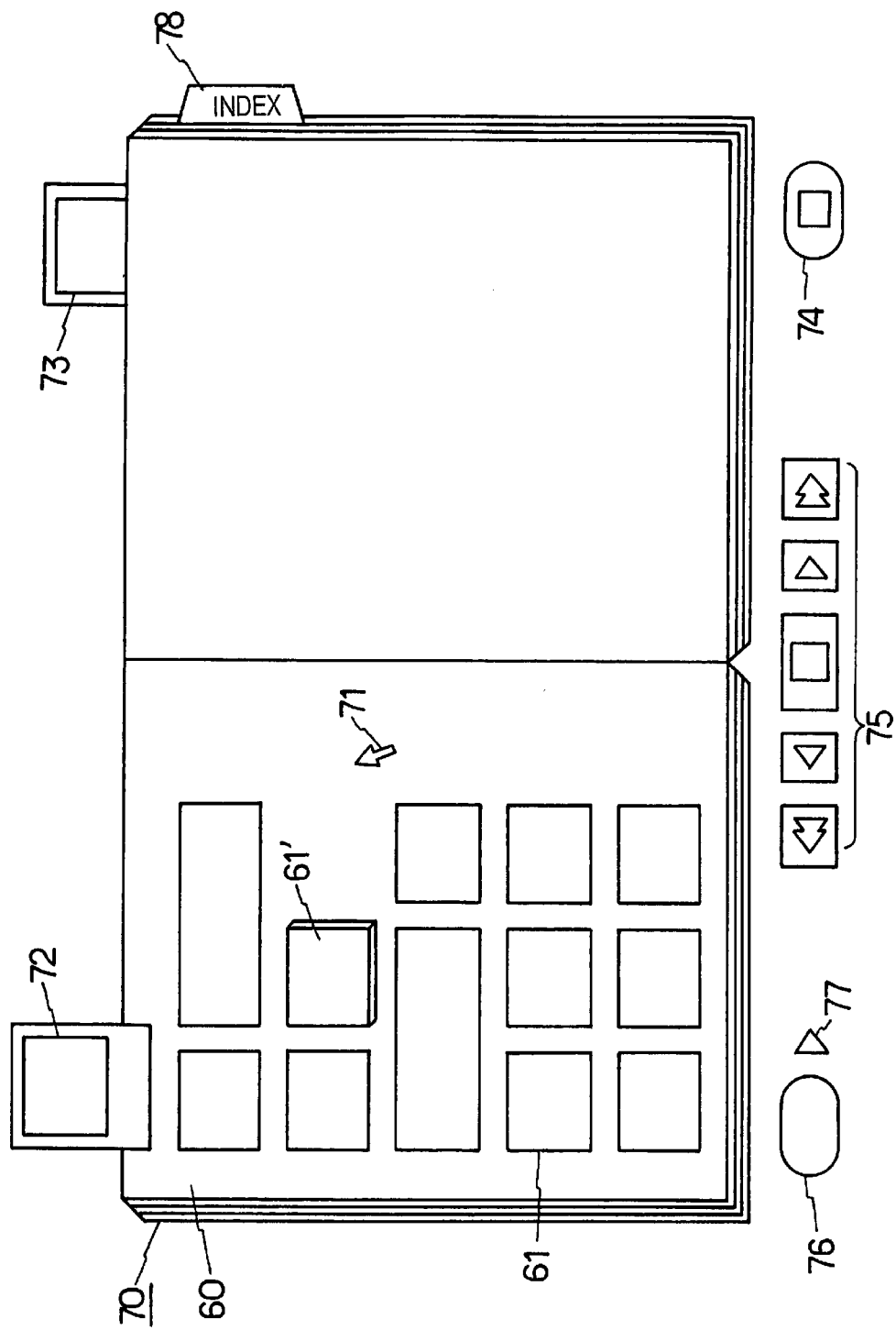
FIG. 10 is a diagram showing an example of a page image in an electronic image book laid out according to the present invention.

In FIG. 10 there is depicted an example of the display image of book-like electronic image book created as described above, with the book held open. The electronic image book is displayed in the screen of a browsing interface.

On a page 60 of a thick book image 70, there are displayed a sequence of representative images 61 recorded as item numbers in the column 903 of the page contents table 122B of the page management table 122B (FIG. 9) at positions and in sizes recorded in the columns 904 and 905. There are also displayed user image tags 72 and 73 and a side tag 78 by referring to the tag table 122D (FIG. 9). Placed below the book image 70 are buttons representing individual functions (a user image tag button 74, page control buttons 75, a playback button 77 and an edit mode button 76).

The page control buttons 75 permit such a page access operation as a forward, backward, fast forward, or fast backward page turning operation.

This interface has a browsing and an editing mode, and is switchable between the two modes by clicking on the edit mode button 76.

In the browsing mode, the following operations are possible.

When a buttoned representative image 61' on the page 60 of the book image 70 is pointed at by a pointer 71, the video segment (section) corresponding to the representative image 61' are extracted in accordance with the video playback starting time 907 specified in the table 122B in the page management table 122 depicted in FIG. 9, and the actual video images are played back. When the displayed page is a link-set page such as the table of contents, link information 902 is read out of the page index table 122A in the page management table 122, and an access is made to the desired page in the table 122B.

For example, when the user image tag button 74 depicted in FIG. 10 is clicked, the specified representative image or its reduced version is pasted as the user image tag 72 on the page at the top thereof.

During browsing other pages than that corresponding to the specified image tag, if the user points at the user image tag 73 appearing to extend off a page, a jump is made to the page there the tag is present. Of course, these tags can be removed at any points in time.

In the case where the user sets a desired condition in the column of highlighting method 909 in the page contents table 122B in the page management table 122 and selects one of displayed items which satisfy the condition, a jump is made to the associated page corresponding to the selected item, at the same time, the associated representative image can be highlighted.

In the editing mode the following operations can be performed.

When the user points at the representative images 61 one after another with a mouse or similar pointing device, it is recorded in a table which representative images were specified in what order. Upon click on the playback button 77, reference is made to an edit table and partial video images associated with the specified representative images are played back in their specified order. This is a sort of video editing, which cannot be used for precise editing on a framewise basis as is possible with a conventional video editing system but offers simple editing means for changing the order of playback that is needed in a presentation system or the like.

Next, a detailed description will be given, with reference to FIG. 11, of the procedure for browsing the electronic image book displayed, for example, as depicted in FIG. 10. In this browsing procedure, reference is made to the page management table 122 shown in FIG. 9 and the video file 120.

In step 1101 the book-type interface depicted in FIG. 10 is drawn on the computer display. This book-type interface is initially drawn to display the front cover but the area 60 of the book image 70 where the buttons representing functions (such as the page control buttons 75) and the representative images 61 are aligned is redrawn as by the forward or backward page turning operation.

A concrete drawing procedure is such as described below. Reference is made to the page index table 122A in the page management table 122 to search for the page contents table 122B1 corresponding to the page to be drawn. In accordance with the described contents of the table, every image in the item column 903 is drawn in the size specified in the size column 905 at the position specified in the position column 904.

In step 1102 the procedure enters the state in which to wait for an input from the user, and upon inputting from a mouse or keyboard, the procedure goes to the next step.

In step 1103 a check is made to see which page control button 75 (the button for the forward, backward, fast forward or fast backward page turning operation, or for stop) was pressed. In step 1105 check is made to see if the tag (the user image tag or side tag) were pressed. When the page control button or the tag was pressed, the specified page is drawn in step 1104. When the "page forward turning" button is pressed, the page immediately following the current page is displayed. When the "backward page turning" button is pressed, the immediately preceding page is drawn. When the "fast forward or backward page turning" button is pressed, the next or previous page is displayed. This procedure is repeated until the "stop" button is pressed. When the tag is pressed, reference is made to the page column 912 in the tag table 122D to specify the page corresponding to the tag, followed by drawing the page.

In step 1106 a check is made to see if the user image tag button 74 was pressed. If so, then the procedure goes to step 1107, wherein if the current page has no user image tag, a user image tag is newly generated, and if the page has the tag, then it is removed. In the case of generating the user image tag, a new line column is added to the tag table 122D, then the number of the current page and the representative image selected immediately before are stored in the columns 912 and 914, respectively, and the tag is drawn on the screen.

When the tag is already present, information concerning it is removed from the tag table 122D.

In step 1108 a check is made to see if one of the representative images was specified by the user. If so, the procedure goes to step 1109, wherein an access is made to the item number of the specified representative image in the page management table 122 to refer to the playback starting/ending times column 907 in the page contents table 122B, and the corresponding partial video (of the duration defined by the playback starting/ending times) is read out of the video file 120 and played back for display on the monitor or the like.

In step 1110 a check is made to see if the edit mode button was pressed. If so, the normal browsing mode is changed to the edit mode (step 1111), followed by waiting for an input from the user (step 1112).

In the edit mode, when the page control button and the tag are specified (steps 1113 and 1115), the specified page is drawn (step 1114) as is the case with the browsing mode described above.

In step 1116 a check is made to see if the playback button was pressed. If so, the procedure goes to step 1117, wherein partial video images are played back for display on the monitor or the like in the order in which the representative images recorded in step 1117 were specified. The partial video images are sequentially played back for display while making reference to the page management table 122 to read out information from the playback starting/ending times column 907 and reading out the contents of the corresponding segments from the video file 120.

In step 1120 a check is made to see if the edit mode button was pressed, and if so, the edit mode is switched back to the normal browsing mode.

Figure 11:
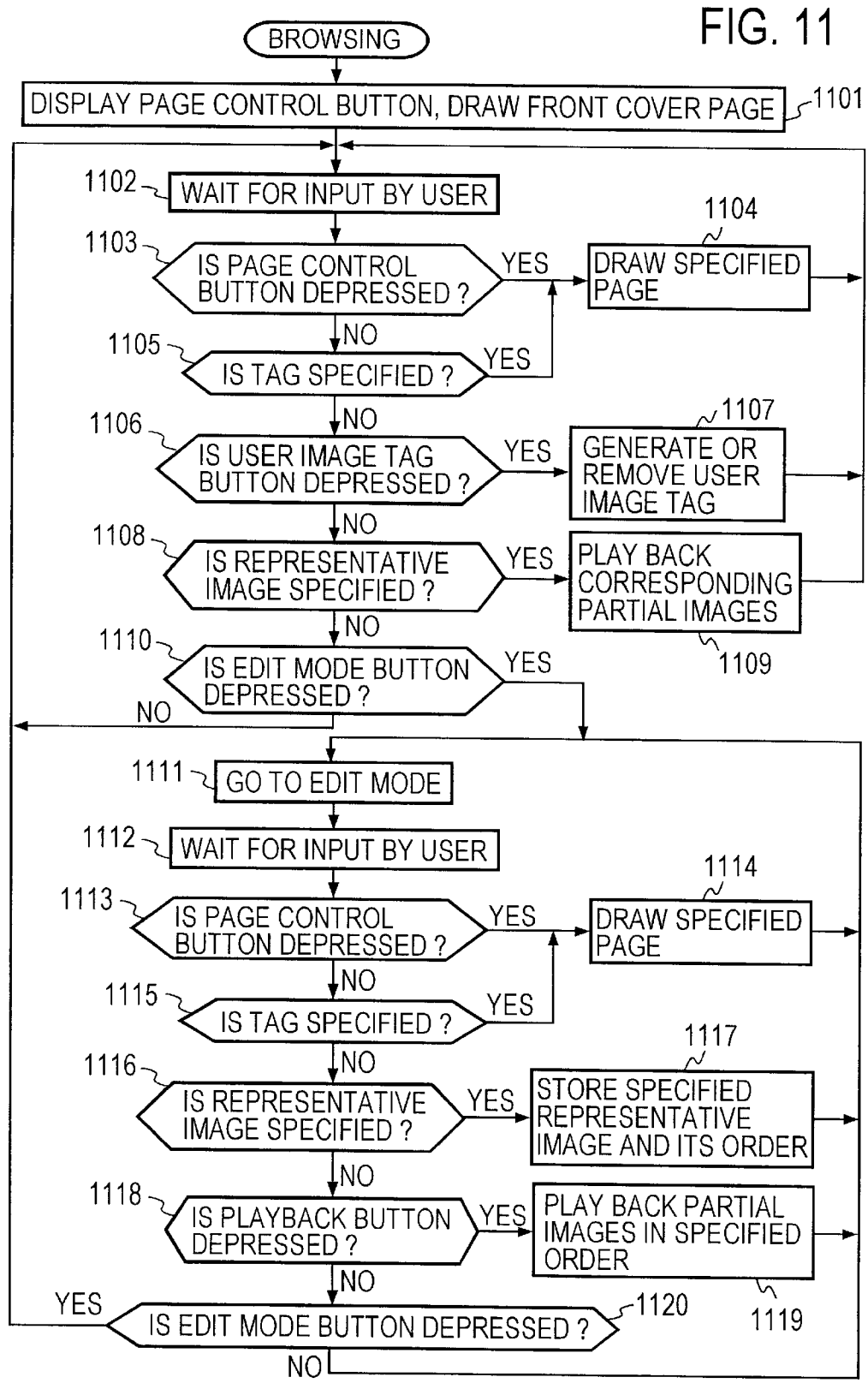
FIG. 11 is a flowchart showing a procedure for browsing the electronic image book created according to the present invention.

While in the above the electronic image book has been described to be browsed by executing the procedure of FIG. 11 independently of the image book creating procedure 401 through 409 in FIG. 4, it is also possible to perform the processing from the video analysis to the layout and the browsing in real time if the system includes processing capabilities therefor. The video that is provided as the input for the creation of the electronic image book may be provided from a file stored on a hard disk or a videotape which is played back on a computer-controllable video cassette recorder. Also it is possible to employ a procedure which provides TV signals as the input and creates a video file on a hard disk in parallel to with event detecting step 401. The types of events are not limited specifically to those mentioned above, but various other events can be defined for use according to the kinds of videos and usage. It is also possible to employ a system configuration in which the event detecting procedure (step 401) and the electronic image book creating procedure (steps 403 to 409) in the electronic image book creating process are implemented as separate programs and are integrated through the video index management table 121A where the detection results are stored. With such a system configuration, it is possible to distribute tasks such that the time-consuming event detection is made on a high-performance workstation, whereas the detection results are transferred to an inexpensive personal computer or the like for the creation of the electronic image book.

Although in the above the user is made to input the electronic image book creating conditions in step 403, it is also possible to perform this step prior to the event detection (step 401) and to detect only event necessary for the creation of the electronic image book in step 401. Furthermore, when the user is not required to change the electronic image book creating conditions, it is also possible to omit this step and to program the creating conditions in advance.

Figure 12:
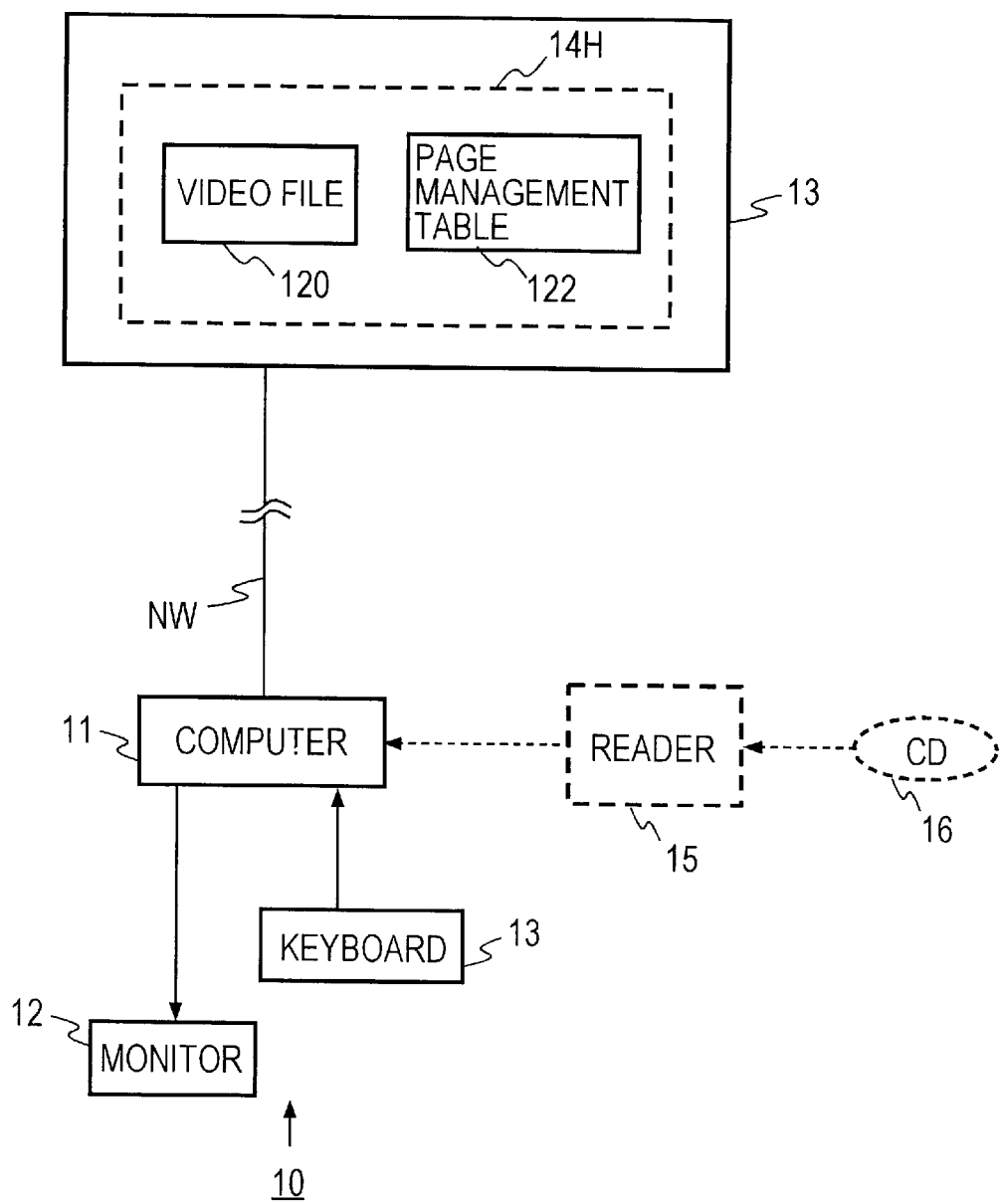
FIG. 12 is a diagram depicting an example of the use environment of the electronic image book created according to the present invention.

FIG. 12 illustrates an example of the use environment of the above-described electronic image book according to the present invention; the electronic image book is provided at a distance location and a user utilizes it through a network. In this instance, the user is shown to browse through the electronic image book by the use of an electronic image book playback device 10 composed of, for instance, a computer 11, a monitor 12 and a keyboard 13. The computer 11 is connected via a network NW to a server 14. The server 14 has a recording medium, for example, a hard disk 14H, on which the video file 120 and the page management table 122 are stored as the electronic image book. The page management table 122 and the video file 120 may be transferred together to the user before utilization of the book, but the transfer of the video file takes much time. Hence it is preferable to employ a system configuration wherein the user starts browsing with downloading only the page management table 122 from the server and, on demand, has the server transfer from the video file 120 the data corresponding to a video segment. To perform this, it is desirable that the page management table 122 forming the electronic image book and the video file be managed separately of each other.

The electronic image book may also be used in such a way as indicated by the broken lines in FIG. 12, wherein a CD, CD or similar recording medium with the video file 120 and the page management table 122 recorded thereon is mounted on a reader 15 and the user uses the computer 11 to access the page management table and the video file in the recording medium 16 for browsing the electronic image book. In this instance, the video file need not always be the video file 120 used for the creation of the electronic image book but it may be a video file that has recorded therein only partial videos linked with the electronic image book.

<<Embodiment 2>>

The layout rule for laying out representative images on a page will be described in detail with reference to the flowchart of FIG. 13 and examples of layouts depicted in FIGS. 14A, 14B and 14C. Let an i-th representative images to be laid out be represented by $P_i$ (where i=1, 2, ..., N), the number of representative images by N and the height and width of the page by H and W, respectively.

The layout rule explained here in this embodiment is used when the representative images generated by step 404 in FIG. 4 vary in size. For example, when a panoramic image is used as a representative image, the size of the panoramic image varies with the camera parameter (the amount of motion of the camera used).

In step 1301 a variable i indicating the number of the representative image concerned is initialized to 1. In step 1302 a page is newly created. In step 1303 information about the sizes of the representative images $P_i$, that is, the heights and widths of the images, are obtained. In step 1304, all possible layouts which satisfy a preset layout constrains and accommodate the representative images $P_i$ in the current page are enumerated (The procedure therefor will be described in more detail later on).

The layout constraint used here is "the representative image $P_{i+1}$ is next to the representative image $P_i$ on the right thereof, or below the representative image $P_i$ on the left thereof" (layout constraint R1). Intuitively speaking, as is the case with a sentence written from left to right, the representative image $P_{i+1}$ is laid out, if possible, in the space next to the representative image $P_{i+1}$ on the right thereof, but if impossible, then a new line is started and it is laid out at the position below the representative image $P_i$ on the left thereof. The layouts depicted in FIGS. 14A, 14B and 14C satisfy the constraint, but the layout in FIG. 14D does not satisfy it. This constraint, if strictly defined, means that the following conditions be satisfied for every i:

$$x_{max}(P_i) < x_{min}(P_{i+1}) \text{ and } y_{max}(P_{i+1}) > y_{max}(P_i)$$

or $$y_{min}(P_{i+1}) > y_{max}(P_i)$$

In this case, assume that the x–y coordinate system has the same origin 0 and orientation as shown in FIG. 14A, and $x_{max}(P)$, $x_{min}(P)$, $y_{max}(P)$ and $y_{mix}(P)$ represent the maximum and minimum values of the x and y coordinates of the region P, respectively.

Turning next to FIG. 15, a concrete example of laying out four representative images $P_1$, $P_2$, $P_3$ and $P_4$ in page 60 will be described. FIGS. 16A, 16B and 16C each depict the state in which the representative images $P_1$, $P_2$ and $P_3$ are already laid out, and indicate the position where to place the representative image $P_4$ next (that is, i=4). In step 1304 (FIG. 13), layouts which satisfy the constraint R1 and fit in the page are all enumerated. In the layout of FIG. 16A the representative image $P_4$ on the representative image $P_1$. This layout satisfies the constraint R1 but does not fit in the page, and hence it is rejected. The layouts of FIGS. 16B and 16C satisfy the constraint R1 and go in the page, and hence they are enumerated. The layout of FIG. 16D does not go in the page and hence is rejected.

In step 1305, a check is made to see if there is a layout that fits in the page. In concrete terms, it is checked whether one or more layouts were found in step 1304. In the absence of the layout that goes in the page, the procedure goes to step 1306, wherein a page eject process is done (to output layout information of one page, for instance). In the examples of FIGS. 16A to 16D, two layouts (FIGS. 16B and 16C) go in the page; hence, the procedure proceeds to step 1306.

In step 1306, the area of wasted space (hereinafter referred to as dead space area) is computed for each of the enumerated layouts in step 1304, then a layout with the least wasted space is calculated, and in step 1307 the representative images $P_i$ are placed at those calculated positions.

In the cases of FIGS. 16B and 16C, the hatched regions go to waste. The reason for this is that if the representative image $P_5$ is placed over such a hatched region, the layout constraint R1 is not satisfied in that the temporal order is not preserved. A comparison of the layouts depicted in FIGS. 16B and 16c shows that the dead space area in the latter is smaller than in the former; accordingly, the layout of FIG. 16C is adopted and the representative image $P_4$ is placed at the position indicated in FIG. 16C.

Figure 13:
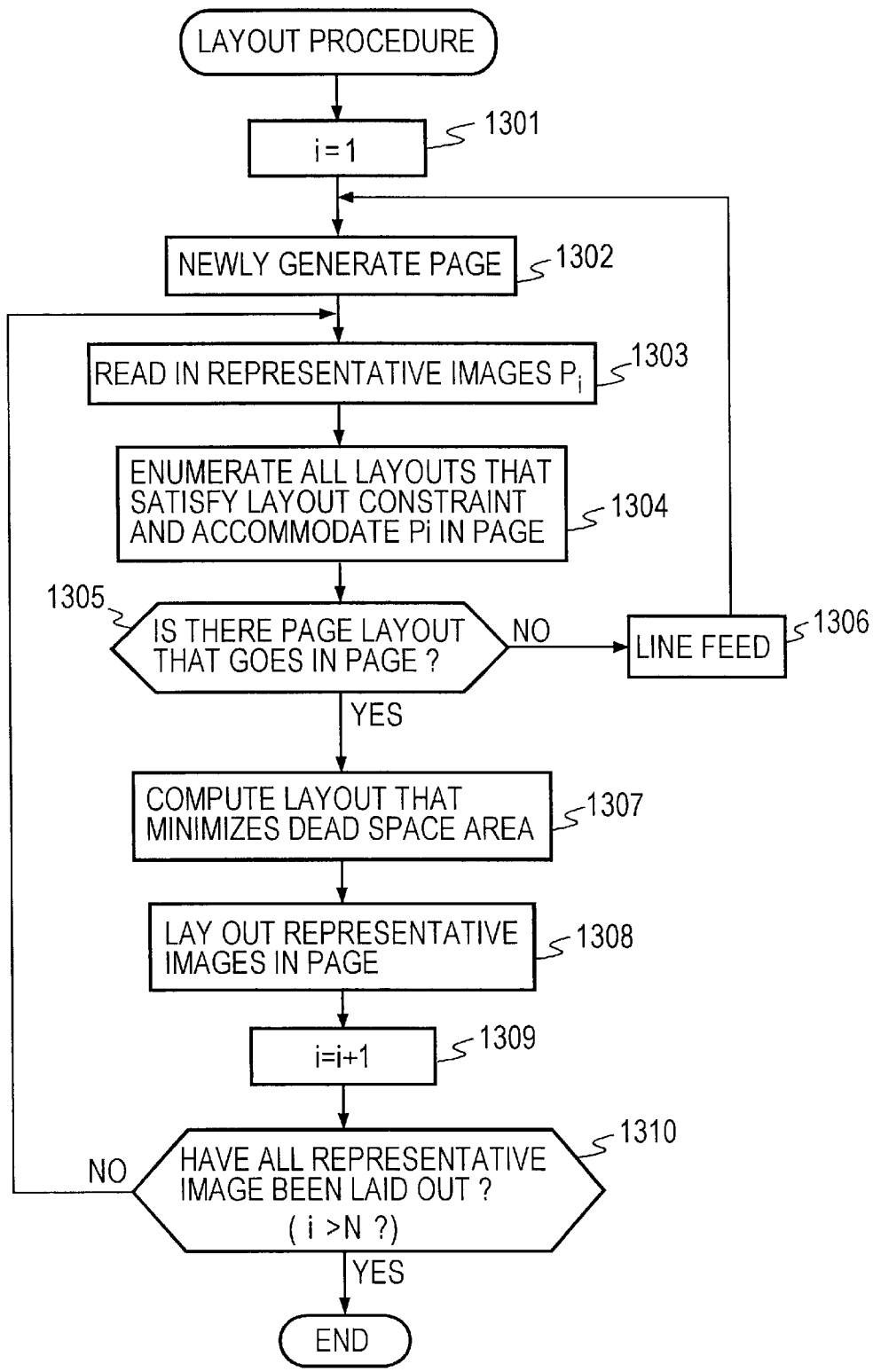
FIG. 13 is a flowchart for explaining Embodiment 2.
Figure 17:
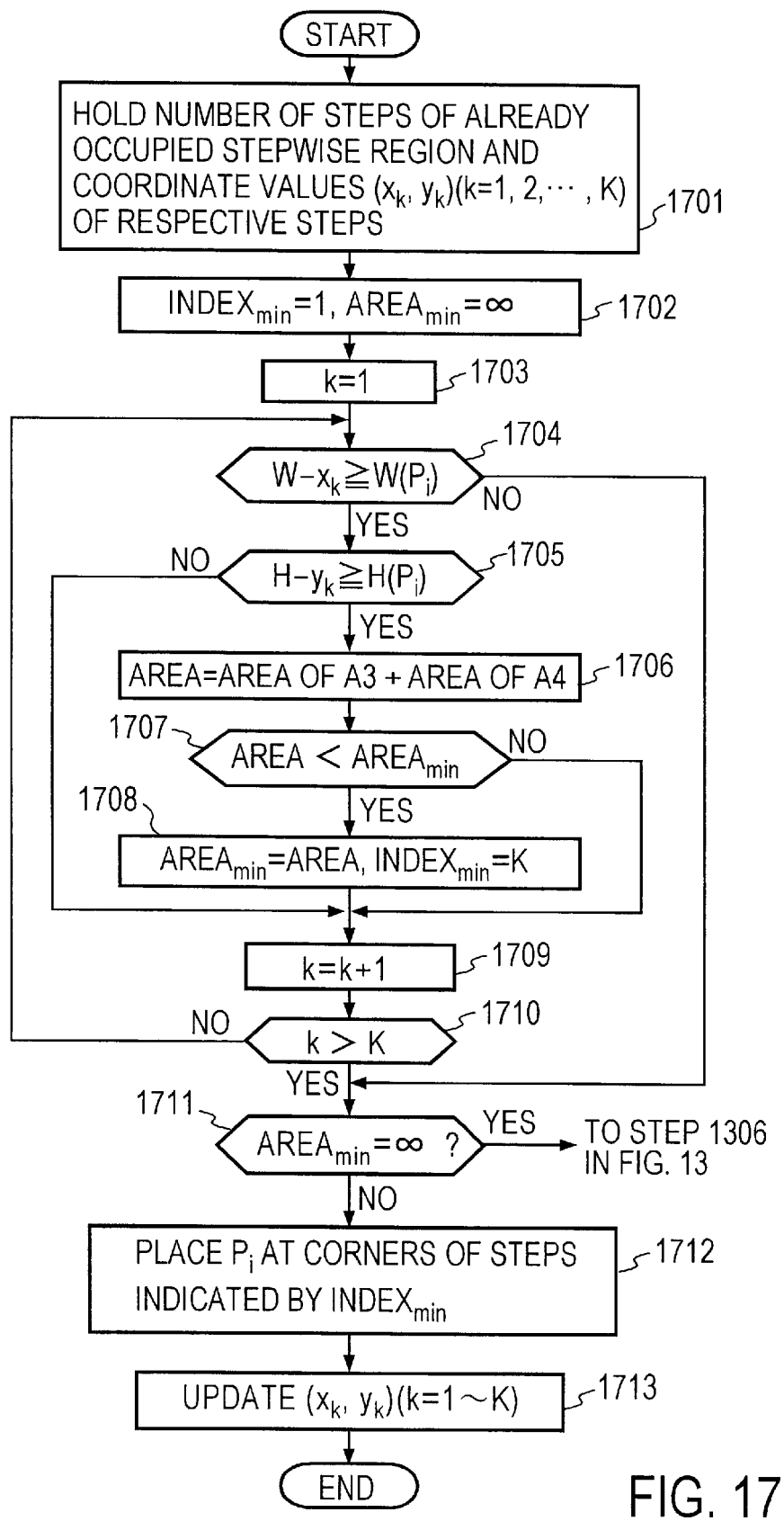
FIG. 17 is a flowchart for explaining Embodiment in more detail.

FIG. 17 is a flowchart for explaining in detail steps 1304, 1305 and 1307 in FIG. 13.

Figure 18:
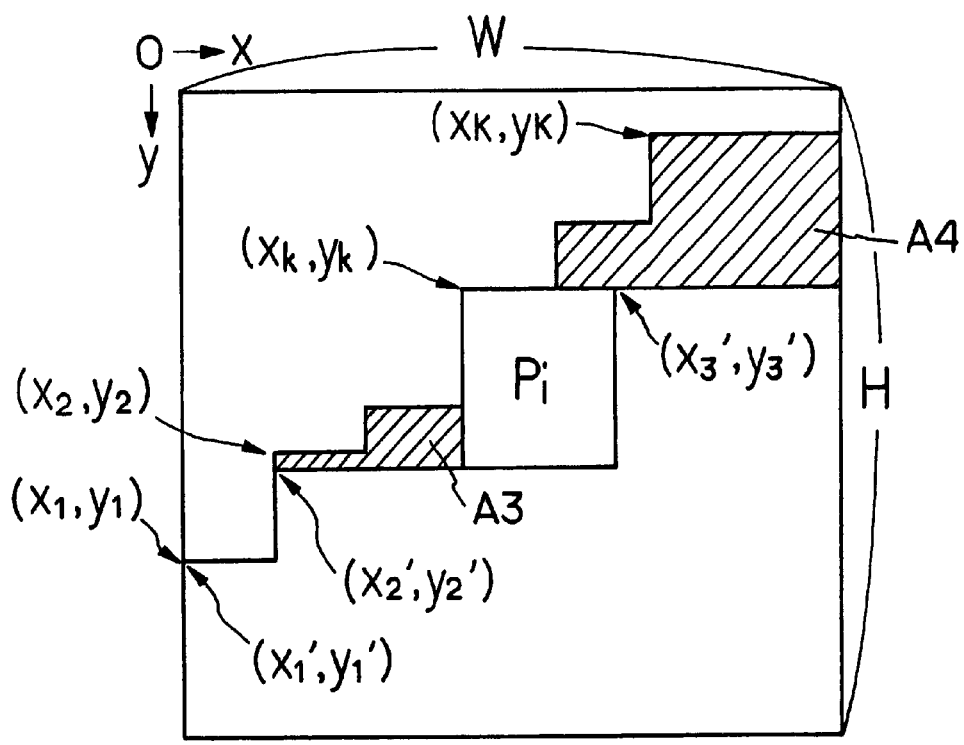
FIG. 18 is a diagram for explaining an occupied region management method in Embodiment 2.

Let is be assumed, as shown in FIG. 18, that the number of steps of the region (the stepwise region) already occupied by representative images $P_1$, $P_2$, . . . , $P_{i-1}$ is K and that the coordinate value of each step corner is $(x_k, y_k)$ (where k=1, . . . , K) (step 1701). Consider the placement of the representative image $P_i$ in such an instance. When i=1, that is, no representative image has not been laid out, K=1 and $x_1$=$y_1$=0. In step 1304 in FIG. 13, all the layouts that permit placement of the representative image $P_i$ are enumerated; taking into account the minimization of wasted space under the layout constraint, only K layouts are usable in which the upper left corner of the representative image $P_i$ overlaps the step corner.

In step 1702, a variable $AREA_{min}$ indicative of the minimum area of dead space region is initialized to infinity ($\infty$), and at the same time, a variable $INDEX_{min}$ indicative of k which minimizes the dead space region is initialized to 1. Then, k is initialized to 1 (step 1703), and the following process is repeated for k=1, 2, . . . , K. In step 1704, a check is made to see if the width of the representative image $P_i$ goes in the k-th step. H(P) and W(P) denote the height and width of the representative image P, respectively. If the width of the representative image does not go in that step, then the procedure exits from the loop and proceeds to step 1711. In step 1705 a check is made to see if the height of the representative image $P_i$ goes in the k-th step. If not, then the procedure goes to step 1709. In step 1706, the dead space area AREA is calculated as the sum of two regions A3 and A4 indicated by hatching in FIG. 18. The areas of the hatched regions can each be calculated from the width and height of each step.

In step 1707 the variable $AREA_{min}$ and the area AREA calculated as mentioned just above are compared, and if AREA <$AREA_{min}$, the step 1708 is performed to update both of $INDEX_{min}$ and $AREA_{min}$ with AREA. In step 1709, the variable k is incremented by 1. In step 1710, a check is made to see if the above-described process has been completed for every step, and if not, then the procedure returns to step 1704. In step 1711, a check is made to see if there has been found the layout which fits in the page, and if not, the procedure returns to step 1306 in FIG. 13, performing the page break processing. The variable AREA min was initialized to $\infty$ in step 1702; if no layout has been found which fits in the page, the variable is held unchanged at $\infty$. In step 1712, the layout that the representative image $P_i$ is placed at the corner of an $INDEX_{min}$-th step is adopted. In step 1713, the coordinate value $(x_k, y_k)$ is updated corresponding to an increase in the occupied region by the addition of the representative image $P_i$. In the example of FIG. 18, the step number K of the stepwise region is updated to 3, and $(x_k, y_k)$ is updated to $(x_1', Y_1')$, $(x_2', y_2')$ and $(x_3', y_3')$.

In this embodiment, the dead space region can be estimated in various ways. If the size of an average representative image is given, then it is also possible to define, as a dead space region, a region wherein a rectangle of that size cannot be laid out. Although in the above the layout constraint is "the representative image $P_{i+1}$ is next to the representative image $P_i$ on the right thereof, or below the representative image $P_i$ on the left thereof" (in the same orientation as in the case of writing in a Western language), various other constraints can be used. To lay out images downwards from the upper right corner of the page as in the case of a vertically written Japanese sentence, a layout constraint "the representative image $P_{i+1}$ is adjacent to but below the representative image Pi, or above it on its right side" is used. It is also possible to lay out images from the upper right corner of the page to left just like frames of a comic strip. While in the above the representative images have all been described to be placed in rectangular regions, the invention is not limited specifically to the rectangular region. A rectangular region with a hole therein or an arbitrary polygonal region may also be used. In the above the representative images are packed in the page as many as possible, but it is desirable, in practice, to separate adjacent representative images are separated by a blank area (a margin) in a way that is pleasing to the eye. Also, it is possible to lay out the representative image after removing their peripheral portions, or reducing them in size, or surrounding them with ornamental frames.

<<Embodiment 3>>

Figure 19:
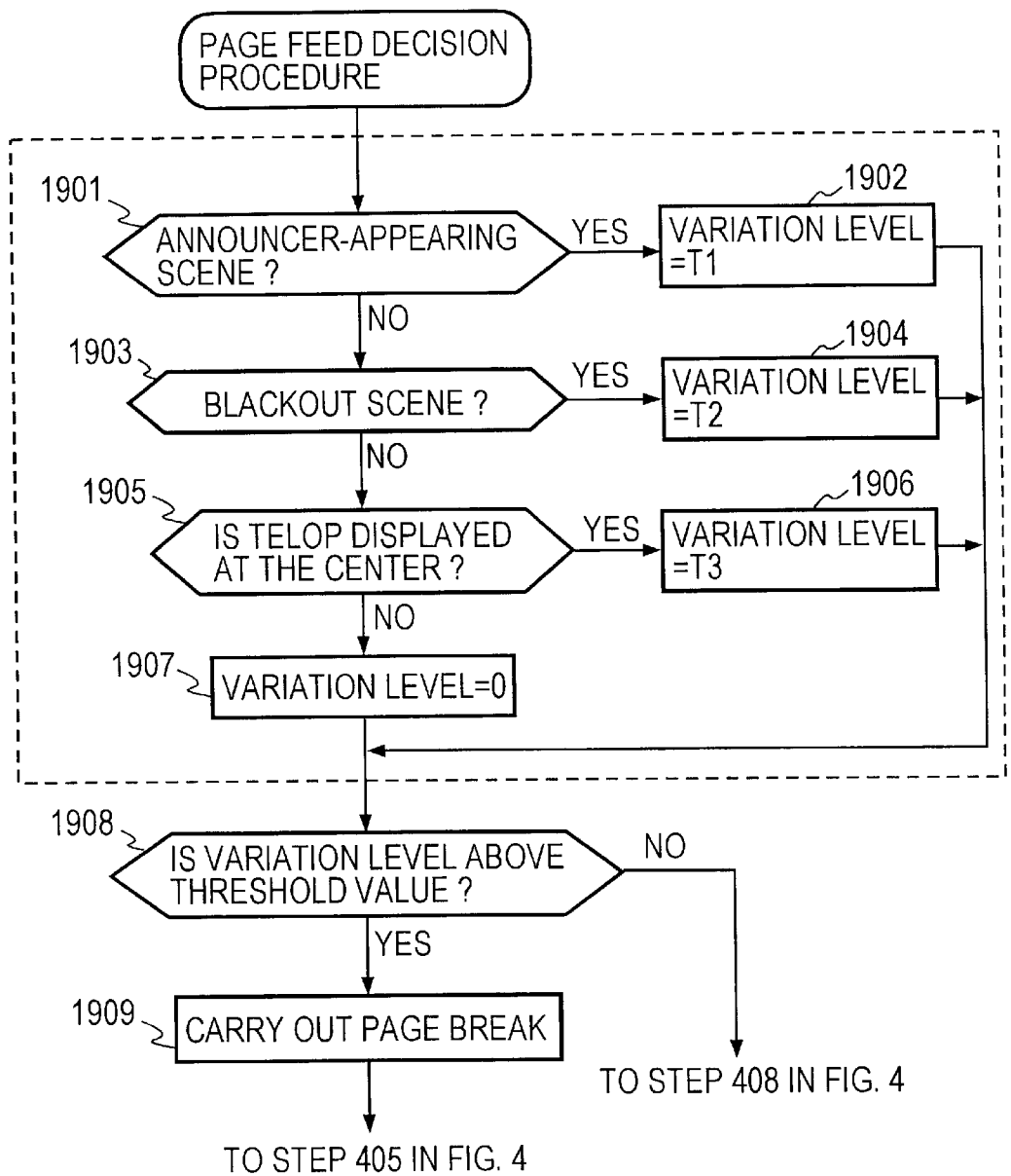
FIG. 19 is a flowchart for explaining a page break decision procedure.

A concrete example of the decision for page break in step 407 in the layout process depicted in FIG. 4 will be described in detail with reference to a flowchart of FIG. 19. This example of the page break decision processing begins a new page at a point in time when the video contents change drastically as in the case of starting a new page with a new chapter or clause in books—this shows the user breaks in the image contents at a glance, allowing ease in his browsing of the electronic image book.

The level of variations in the video contents is defined using the settings in the contents variation level definition (interface) 606. In this case, the user sets the variation level in the range of 0 to 5 for items such as blackout, telop, announcer-appearing scene and silence. As for the telop, the variation level can be set according to the position where the telop is displayed.

In the page break condition setting window 604 the user sets page break conditions. Provision is made to enable the user to select the contents variation level at which to begin a new page. In the line feed condition setting window 603, provision is made to enable the user to select the contents variation level at which when to begin a new line.

There are cases where a blackout is inserted or a telop is inserted at the center of the screen when the video contents change materially, though depending on the form of the video. Such a characteristic display image can be used as a clue for judging breaks in the video contents. As for a news video, the variation level can be defined using an announcer-appearing scene since the items of news change with the announcer-appearing scene.

The page break decision procedure will be described below with reference to the flowchart depicted in FIG. 19. This procedure corresponds to step 407 shown in FIG. 4, and is executed upon each layout of one representative image in the page. In steps 1901, 1903 and 1905 it is checked whether or not representative images are an announcer-appearing scene, a blackout scene and a scene with a telop displayed at the center thereof, respectively. The decisions on the blackout, telop and announcer-appearing scenes may be made referring to the video index management table 121A depicted in FIG. 5A; alternatively, the original video of the video file 120 or its representative images may be analyzed again to make the decisions. When the decision results are YES in steps 1901, 1903 and 1905, the variation levels T1, T2 and T3 set by the user in the contents variation level definition setting window 606 are used in steps 1902, 1904 and 1906, respectively. When the decision results are all NO in steps 1901, 1903 and 1905, the variation level is made 0 in step 1907. In step 1908, a comparison is made between the threshold value set by the user in the page break condition setting window 604 and the variation level. If the variation level exceeds the threshold value, that is, if the page break condition is satisfied, a page ejection is caused in step 1909, and the procedure goes to step 405. If the variation level is lower than the threshold value, no page break is caused, and the procedure goes to step 408 in FIG. 4.

A physical description will be given, with reference to FIG. 20, the appearance of an electronic image book that is actually created. FIG. 20 depicts a sequence of representative images $61_1$ to $61_7$ with the corresponding variation levels indicated under them, and FIGS. 21A, 21B and 21C depict finally generated page images $60_1$, $60_2$ and $60_3$, respectively. In this case, the variation levels set by the user are 1 for a telop appearing at the center of a scene, 3 for an announcer-appearing scene, 1 for a blackout and 0 for other scenes. In the case where it has been set a condition that inserts a page break when the variation level is higher than 3, a page break is created immediately prior to each of the announcer-appearing scenes 612 and 615. As a result, the title of the program is laid out in the first page 601, a news item A composed of the announcer-appearing scene 612, the blackout 613 and the scene 614 ($A_1$, $A_2$, $A_3$, $A_4$) is laid out in the second page $60_2$, and a news item B composed of the announcer-appearing scene $61_5$, the blackout $61_6$ and the scene $61_{17}$ (B1) is laid out in the third page $60_3$. With such a page break inserted for each news item, the user can skip over items of no interest and quickly find out items of interest by browsing.

In this embodiment the variation level is computed through utilization of the announcer-appearing scene, the telop and the blackout, but it is also possible to utilize sound, for example, a silent period, particular tune (a theme tune or the like) and a particular sound effect. Also, the appearance of a particular symbol (logo) may be used. While in the above the page break is inserted, a line feed can also be inserted. To provide a longer break, the page break can be effected to start on even or odd page. The above embodiment has been described to use one threshold value for the contents variation level for the decision of the page break, but a plurality of threshold values may be used to create the line break and the page break.

In a TV program, for example, in a quiz program, a particular tune or sound effect is often inserted immediately before a quiz is presented. By preregistering such a particular tune or sound effect and predetecting, as an event, the section in which it is inserted, it is possible to define the contents variation level based on the event. As a result, a page break can be inserted for each quiz item. By inserting page breaks before and after a commercial, it is possible to browse the electronic image book with the commercial and the contents of the program laid out in different pages.

In sportscasting, for example, in a broadcast relayed from the ballpark, it is possible to detect the beginning of each inning through unitization a telop and insert a page break there. In the case of a movie or drama, when text information of a scenario can be obtained in association with a video file, it is possible to detect a long break between scenes from scenario data and insert the page break in the detected break.

In the case of a video by a consumer video camera, the data and time of shooting are recorded on the tape. It is possible to extract the date and time of shooting from the data recorded on the data and insert a page break when the date and time change. For example, in the case of a video shot while traveling, it is possible to create an electronic image in which a page break is inserted for each date. When the data on the date and time are not available directly from the tape, the date and time can also be recognized from a telop displayed on the screen.

<<Embodiment 4>>

Figure 22:
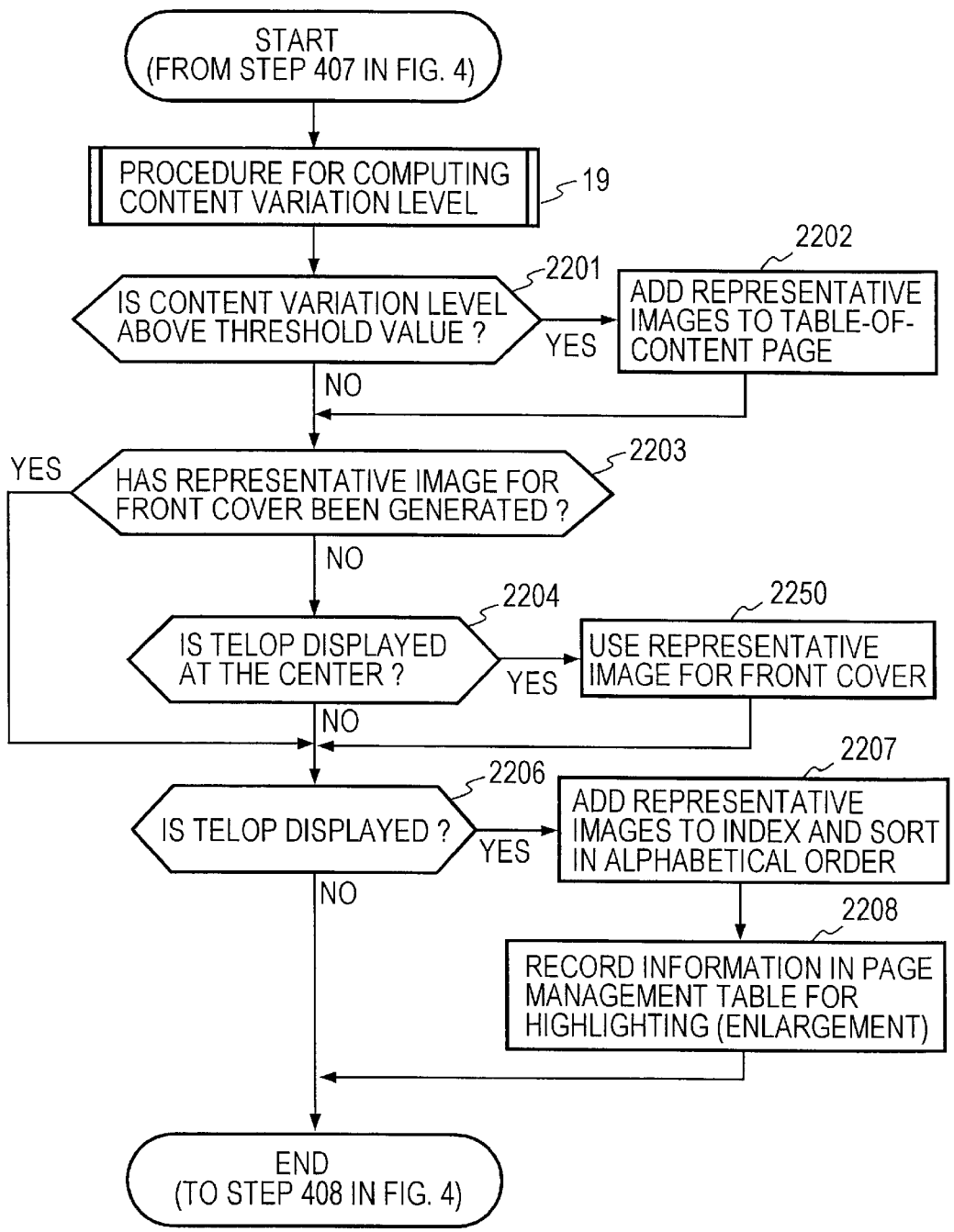
FIG. 22 is a diagram for explaining procedures for automatically creating a table of contents, a front cover and an index page.

A description will be given, with reference to the flowchart of FIG. 22, of the procedures for creating the table of contents, the front cover and the index in step 109 in FIG. 9. In this embodiment, the table-of-contents, front-cover and the index pages are automatically created referring to video index information and picking images that meet certain conditions.

In the first place, the user sets the table-of-contents generating condition 607, the front cover generating condition 608 and the index generating condition 609 through a user interface shown in FIG. 6 which is used to set various conditions.

In step 19, the level of contents change is computed for the current-noted representative image. Since this is the same process as that surrounded by broken lines in FIG. 19 and described previously with reference to Embodiment 3, no detailed description will be repeated.

In step 2201, when the level of contents variation corresponding to the representative image is higher than the threshold value set by the user as the table-of-contents condition 607, the representative image is added to the table-of-contents page (step 2202). An example of the layout of the table-of-contents is depicted in FIG. 23A. When the user points at a representative image 61 on the table-of-contents page with a mouse or the like, information about the corresponding page is recorded on the page management table 122 (FIG. 9) so as to make a jump to the corresponding page.

In step 2203, a check is made to see if a representative image to be pasted on the front cover has already been created. If not, the procedure goes to step 2204, in which a check is made to see if a telop is being displayed at the center of the representative image concerned, and if so, the procedure goes to step 2205, wherein the representative image is set as the representative image for the front cover and the setting is recorded on the page management table 122. It is desirable to display on the front cover an image that represents the entire video contents, such as the title of a movie or TV program. In this embodiment, a first one of representative images with telops displayed centrally thereof is pasted on the front cover. FIG. 23B shows an example of the screen display of the front cover. While the front cover is shown to have only one representative image 61 pasted thereon, a plurality of representative images can also be used.

In step 2206, a check is made to see if the noted representative image has a telop displayed thereon, and if so, the procedure proceeds to step 2207, wherein the representative image 61 is added to the index page and at the same time character strips displayed on the telop are sorted out in alphabetical order (or in the order of the Japanese syllabary) and the index page is created as exemplified in FIG. 23C. In step 2208, information is recorded as the highlighting method 909 so as to highlight the representative image with the telop displayed thereon.

The conditions for the generation of the table of contents are not limited specifically to those referred to above, and various other conditions can be used. As is the case with Embodiment 3 described above, the table-of-contents page can be created based on particular music, scenario data and date-and-time information recorded by a video camera. Of course, tags corresponding to items of the table of contents can be automatically created simultaneously with the generation of the table-of-contents page.

By automatically generating the table of contents, the index and the front cover, an electronic image book having the appearance of an actual book can automatically be created; during browsing, the user can grasp the synopsis of the entire video contents by referring to the table-of-contents page or quickly access a necessary portion of video through utilization of the index page. When the automatically created table-of-contents, front cover and index pages contain imperfections, it is preferable to correct them in the editing step 409 in FIG. 4. That is, unnecessary items of the table of contents are deleted or index items are added.

A program for implementing the above-described procedures can be stored in a proper recording medium that is readable with a computer, such as a transportable medium memory, semiconductor memory or hard disk.

EFFECTS OF THE INVENTION

As described above, according to the present invention, images sampled from a video for each visually characteristic event are placed in the environment of an electronic image book interface which provides ease of use just like a book. A user can grasp video information from eventwise image arrays laid out in each page, and he can enjoy advantages of the book-like interface by flipping over the pages to grasp the context of the video information or the entire video contents; further, he can access particular portions of the video in various ways through utilization of feature information of the video.

What is claimed is:

1. A method for creating from a video an electronic image book with a book-type interface, comprising the steps of:

(a) detecting predetermined types of events by analyzing the video, and creating a video index management table in which the detected events, start and end time of the events and feature information of images computed during the analysis of the video are managed as video index information in correspondence with partial video images of the events in said video;

(b) making a user specify conditions for creating representative images of the electronic book;

(c) referring to the video index information in said video index management table to meet the user's specified conditions, selecting from said video a sequence of images that satisfy said creating conditions, and generating a sequence of representative images;

(d) laying out said sequence of representative images in their temporal order in a page of a predetermined size defined in a memory, deciding whether the next representative image to be laid out relative to the position of the current representative image already laid out extends off the current page region and, if so, performing a page break and laying out the subsequent representative image on the new page, and computing the variation level indicating the degree of a change in the video contents, and performing a page break when said variation level exceeds a predetermined value; and (e) generating a page management table which manages information about the layout of said representative images and link information from said representative images to the corresponding partial video images in said video.

2. The method of claim 1, wherein said step (a) includes a step of detecting a scene-change as an event, and said step (c) includes a step of selecting, as a representative image, an image immediately following the scene-change event or an image at a certain elapsed time.

3. The method of claim 1, wherein said step (c) includes a step of synthesizing at least one of said representative images from a plurality of images extracted from said video.

4. The method of claim 3, wherein said step (a) includes a step of detecting an event concerning a camera operation, and said step (c) includes a step of generating, for a scene involving no camera operation event, an image immediately following the scene-change event or an image at a certain elapsed time as a representative image, and for a scene involving the camera operation event, generating as a representative image a panoramic image synthesized from a plurality of images extracted from that scene.

5. The method of claim 1, wherein said step (d) includes a step of placing an icon, representing the existence of particular sound information, on or adjacent to said representative image linked to said video segment containing a particular sound information.

6. The method of claim 1, wherein said page management table generating step (e) includes a step of generating a page contents table which contains, in correspondence with item numbers of representative images as items to be displayed in each page, positional information specifying the positions of those representative image in the page layout and said link information to said partial video corresponding to the representative images.

7. The method of claim 6, wherein said page management table generating step (e) includes a step of generating an image data table with representative image data written therein in correspondence with said item numbers in said page contents table.

8. The method of claim 6 or 7, wherein said page contents table generating step includes a step of writing link information for partial videos in said video corresponding to the item numbers.

9. The method of claim 6 or 7, wherein said electronic image book comprises a front cover page, a table-of-contents page, a main-body page, and an index page, and which further comprises a step of generating page contents tables corresponding to said pages and a page index table that holds pointers for said page contents tables corresponding to said pages.

10. The method of claim 9, wherein said page index table generating step includes:
 a step of enumerating those of said representative images in said page contents table whose additional information in said page contents table meet the condition specified by the user, at the time of or after laying out said representative images;
 a step of laying out the enumerated representative images as the front cover, or the table of contents, or indexes in the front cover page, or table-of-contents page, or index page, and additionally generating a page contents table of the front cover page, or table-of-contents table, or index page for holding information about the layout in correspondence with the representative images; and
 a step of recording information associated with said front cover page, table-of-contents page, or index page in said page index table.

11. The method of claim 10, wherein event types and additional image information are given predetermined weighting coefficients in advance and the sum of weighting coefficients for each representative image is defined as the level of image contents variation of said each representative image, and wherein said page index table generating step includes a step of calculating the level of image contents variation for each representative image, deciding whether the calculated value exceeds a predetermined value and, if so, adding said representative image to said table-of-contents page.

12. The method claim 10, which further comprises a step of deciding whether each representative image carries a telop centrally thereof and, if so, placing the representative image as a display image on the front cover page.

13. The method of claim 10, which further comprises a step of repeating, for each representative image, a process of deciding whether said each representative image contains a telop displayed centrally thereof and, if so, adding the representative image as an index item to the index page, and generating the index page by arranging said index items by a predetermined rule.

14. The method of claim 6, wherein said page contents table generating step includes a step of adding to said page contents table information for highlighting the representative image on the layout when additional information about said representative image meets predetermined particular condition.

15. The method of claim 1, wherein event types and additional image information, which cause page breaks, are given predetermined weighting coefficients in advance and the sum of the weighting coefficients for each representative image is defined as the level of its image contents variation, and wherein said step (d) includes a step of calculating, in the layout of said sequence of representative image, the level of contents variation of each representative images, comparing the calculated value with a predetermined threshold value and, if the former is larger than the latter, performing a page break and laying out the subsequent representative images on the new page.

16. The method of claim 1, wherein said step (d) includes a step of placing the representative images at positions where to minimize the area of a wasted regions under the conditions that satisfies layout constraints resulting from the temporal order of said representative images and that their layout fits in the page concerned.

17. A method for utilizing an electronic image book having a book-type interface, which has: a page contents table having written therein, for each page, item numbers and display positions of representative images to be displayed in said each page, and information about video segments linked to the representative images; an image data table for holding image data corresponding to the item number of each representative image; a video file storing video data of linked video segments; a page index table having held therein each page number and a pointer for pointing at the page contents table in correspondence with the page number, and a tag table for a user, said method comprising the steps of:
 (a) deciding whether a page control button was pressed and, if so, referring to said page contents table corresponding to the page specified by the control button and reading out the item number and positional information, then reading out of said image data table the image data corresponding to the read-out item number, and displaying the read-out data on a page screen at the position specified by said positional information to thereby display a specified page screen;
 (b) deciding whether a representative image button was pressed and, if so, link information of the corresponding representative image is read out of said page contents table corresponding to the pressed representative image button, then reading out from said video file the partial video specified by the read-out link information and playing it back on the screen;
 (c) deciding whether a tag pasting button on the page screen was pressed and, if so, writing the item number of the representative image specified by the user on the current page in said tag table in correspondence with the current page number, and reading out the corresponding image from said image data table and pasting it as a tag image at a specified position and in a specified size;
 (d) deciding whether the tag image was pressed in an arbitrary page and, if so, reading out of said tag table the page number specified by the pressed tag image, then referring to said page contents table corresponding to the page specified by the read-out page number, then reading out therefrom the item number and position information of the image, then reading out from said image data table the image data corresponding to the read-out item number, and displaying the read-out image data on the page screen at the position specified by said positional information to thereby a display screen with said tag pasted thereon.

18. The method of claim 17, which further comprises the steps of:
- (c) when a representative image as a particular item of the table-of-contents page is specified, accessing the page contents table containing the item number of the specified image;
- (d) obtaining the item number and positional information shown in the page contents table and reading out of said image data table the image data corresponding to the item number; and
- (e) displaying the read-out image data on the page screen at the position specified by said positional information to thereby display the specified page screen.

19. The method of claim 17, which further comprises the steps of:
- (c) when a representative image as a particular item of the index page is designated, accessing the page contents table containing the item number of the specified image;
- (d) obtaining the item number and positional information shown in the page contents table and reading out of said image data table the image data corresponding to the item number; and
- (e) displaying the read-out image data on the page screen at the position specified by said positional information to thereby display the specified page screen.

20. The method of claim 17, which further comprises the step of deciding whether a user specified a sound visualization image displayed in the page and, if so, reading out the associated information from said page management table and displaying it, and reading out the associated partial video from said video file and playing it back.

21. The method of claim 17, which further comprises the steps of:
- (c) deciding whether a button specifying an edit mode was pressed and, if so, entering the edit mode;
- (d) upon each specification of the representative image representing the partial video in said edit mode, storing the linked partial videos of the specified representative images in the order in which they were specified; and
- (e) deciding whether a playback button was pressed and, if so, accessing the linked video segments via said stored link information in the order of their specification, reading the corresponding partial videos from said video file and playing them back.

22. A recording medium having stored therein a program for creating from a video an electronic image book with a book-type interface, comprising the steps of:
- (a) detecting predetermined types of events by analyzing the video, and creating a video index management table in which the detected events, start and end time of the events and feature information of images computed during the analysis of the video are managed as video index information in correspondence with a partial video images of the events in said video;
- (b) making a user to specify conditions for creating representative images of the electronic book;
- (c) referring to the video index information in said video index management table to meet the user's specified conditions, selecting from said video a sequence of images that satisfy said creating conditions, and generating a sequence of representative images;
- (d) laying out said sequence of representative images in their temporal order in a page of a predetermined size defined in a memory, deciding whether the representative image to be laid out next relative to the position of the current representative image already laid out extends off the current page region and, if so, performing a page break and laying out the subsequent representative image on the new page, and computing the variation level indicating the degree of a change in the video contents, and performing a page break when said variation level exceeds a predetermined value; and
- (e) generating a page management table which manages information about the layout of said representative images and link information from said representative images to the corresponding partial video images in said video.

23. The recording medium of claim 22, wherein said process (d) includes a process (d) of placing an icon, representing the existence of particular sound information, on or adjacent to said representative image linked to said video segment containing a particular sound information.

24. The recording medium of claim 22, wherein said page management table generating process (e) includes a process of generating a page contents table which contains, in correspondence with item numbers of representative images as items to be displayed in each page, positional information specifying the positions of those representative image in the page layout and said link information to said partial video corresponding to the representative images.

25. The recording medium of claim 22, wherein said page management table generating process (e) includes a process of generating an image data table with representative image data written therein in correspondence with said item numbers in said page contents table.

26. The recording medium of claim 24 or 25, wherein said page contents table generating process includes a process of writing link information for partial videos in said video corresponding to the item numbers.

27. The recording medium of claim 24 or 25, wherein said electronic image book comprises a front cover page, a table-of-contents page, a main-body page, and an index page, and which further comprises a process of generating page contents tables corresponding to said pages and a page index table that holds pointers for said page contents tables corresponding to said pages.

28. The recording medium of claim 27, wherein said page index table generating process includes:
- a process of enumerating those of said representative images in said page contents table whose additional information in said page contents table meet the condition specified by the user, at the time of or after laying out said representative images;
- a process of laying out the enumerated representative images in the front cover page, or table-of-contents page, or index page, and additionally generating a page contents table of the front cover page, or table-of-contents table, or index page for holding information about the layout in correspondence with the representative images; and
- a process of recording information associated with said front cover page, table-of-contents page, or index page in said page index table.

29. The recording medium of claim 28, wherein event types and additional image information are given predetermined weighting coefficients in advance and the sum of weighting coefficients for each representative image is defined as the level of image contents variation of said each representative image, and wherein said page index table generating process includes a process of calculating the level of image contents variation for each representative image, deciding whether the calculated value exceeds a predetermined value and, if so, adding said representative image to said table-of-contents page.

30. The recording medium of claim 22, wherein event types and additional image information, which cause page breaks, are given predetermined weighting coefficients in advance and the sum of the weighting coefficients for each representative image is defined as the level of its image contents variation, and wherein said process (d) includes a process of calculating, in the layout of said sequence of representative image, the level of contents variation of each representative images, comparing the calculated value with a predetermined threshold value and, if the former is larger than the latter, performing a page break and laying out the subsequent representative images on the new page.

31. The recording medium of claim 22, wherein said process (d) includes a process of placing the representative images at positions where to minimize the area of wasted regions under the conditions that satisfies layout constraints resulting from the temporal order of said representative images and that their layout fits in the page concerned.

32. A recording medium having stored therein a program to provide a method for utilizing an electronic image book having a book-type interface, which has: a page contents table having written therein, for each page, item numbers and display positions of representative images to be displayed in said each page, and information about video segments linked to the representative images; an image data table for holding image data corresponding to the item number of each representative image; a video, file storing video data of linked video segments; a page index table having held therein each page number and a pointer for pointing at the page contents table in correspondence with the page number, and a tag table for a user, said method comprising the steps of:

(a) deciding whether a page control button was pressed and, if so, referring to said page contents table corresponding to the page specified by the control button and reading out the item number and positional information, then reading out of said image data table the image data corresponding to the read-out item number, and displaying the read-out data on a page screen at the position specified by said positional information to thereby display a specified page screen;

(b) deciding whether a representative image button was pressed and, if so, link information of the corresponding representative image is read out of said page contents table corresponding to the pressed representative image button, then reading out from said video file the partial video specified by the read-out link information and playing it back on the screen;

(c) deciding whether a tag pasting button on the page screen was pressed and, if so, writing the item number of the representative image specified by the user on the current page in said tag table in correspondence with the current page number, and reading out the corresponding image from said image data table and pasting it as a tag image at a specified position and in a specified size;

(d) deciding whether the tag image was pressed in an arbitrary page and, if so, reading out of said tag table the page number specified by the pressed tag image, then referring to said page contents table corresponding to the page specified by the read-out page number, then reading out therefrom the item number and position information of the image, then reading out from said image data table the image data corresponding to the read-out item number, and displaying the read-out image data on the page screen at the position specified by said positional information to thereby a display screen with said tag pasted thereon.

33. The recording medium of claim 32, which further comprises the processes of:

(c) when a representative image as a particular item of the table-of-contents page is specified, accessing the page contents table containing the item number of the specified image;

(d) obtaining the item number and positional information shown in the page contents table and reading out of said image data table the image data corresponding to the item number; and (e) displaying the read-out image data on the page screen at the position specified by said positional information to thereby display the specified page screen.

34. The recording medium of claim 32, which further comprises the process of:

(c) when a representative image as a particular item of the index page is designated, accessing the page contents table containing the item number of the specified image;

(d) obtaining the item number and positional information shown in the page contents table and reading out of said image data table the image data corresponding to the item number; and (e) displaying the read-out image data on the page screen at the position specified by said positional information to thereby display the specified page screen.

35. The recording medium of claim 32, which further comprises the process of deciding whether a user specified a sound visualization image displayed in the page and, if so, reading out the associated information from said page management table and displaying it, and reading out the associated partial video from said video file and playing it back.

36. The method of claim 22, wherein said step (a) includes a step of detecting a scene-change a an event, and said step (c) includes a step of selecting, as a representative image, an image immediately following the scene-change event or an image at a certain elapsed time.

37. The method of claim 22, wherein said step (c) includes a step of synthesizing at least one of said representative images from a plurality of images extracted from said video.

38. The method of claim 37, wherein said step (a) includes a step of detecting an event concerning a camera operation, and said step (c) includes a step of generating, for a scene involving no camera operation event, an image immediately following the scene-change event or an image at a certain elapsed time as a representative image, and for a scene involving the camera operation event, generating as a representative image a panoramic image synthesized from a plurality of images extracted from that scene.

39. The method claim 28, which further comprises a step of deciding whether each representative image carries a telop centrally thereof and, if so, placing the representative image as a display image on the front cover page.

40. The method of claim 29, which further comprises a step of repeating, for each representative image, a process of deciding whether said each representative image contains a telop displayed centrally thereof and, if so, adding the representative image as an index item to the index page, and generating the index page by arranging said index items by a predetermined rule.

41. The method of claim 24, wherein said page contents table generating step includes a step of adding to said page contents table information for highlighting the representative image on the layout when additional information about said representative image meets predetermined particular condition.

42. The method of claim 32, which further comprises the steps of: (c) deciding whether a button specifying an edit mode was pressed and, if so, entering the edit mode; (d) upon each specification of the representative image representing the partial video in said edit mode, storing the linked partial videos of the specified representative images in the order in which they were specified; and (e) deciding whether a playback button was pressed and, if so, accessing the linked video segments via said stored link information in the order of their specification, reading the corresponding partial videos from said video file and playing them back.

\* \* \* \* \*